(12) United States Patent
Bronder et al.

(10) Patent No.: US 7,130,467 B1
(45) Date of Patent: Oct. 31, 2006

(54) REAL TIME DATA MATCHING

(75) Inventors: Matthew L. Bronder, Bellevue, WA (US); Tracey M. Frankcom, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/392,740

(22) Filed: Mar. 19, 2003

(51) Int. Cl.
*G06K 9/68* (2006.01)

(52) U.S. Cl. .................. 382/218; 382/240; 382/243

(58) Field of Classification Search .............. 382/143, 382/144, 145, 147, 240, 243, 218, 305, 176; 367/38; 365/185.22; 369/103; 702/14
See application file for complete search history.

(56) References Cited

U.S. PATENT DOCUMENTS

| | | | | |
|---|---|---|---|---|
| 4,711,035 A | * | 12/1987 | Logan et al. | 33/200 |
| 4,942,619 A | * | 7/1990 | Takagi et al. | 382/148 |
| 5,463,701 A |   | 10/1995 | Kantner, Jr. et al. | 382/166 |
| 5,533,148 A | * | 7/1996 | Sayah et al. | 382/240 |
| 6,330,003 B1 | * | 12/2001 | Curtis et al. | 345/648 |
| 6,914,637 B1 | * | 7/2005 | Wolf et al. | 348/473 |
| 7,002,710 B1 | * | 2/2006 | Van Liew et al. | 358/3.28 |

* cited by examiner

*Primary Examiner*—Sheela Chawan
(74) *Attorney, Agent, or Firm*—Ronald M. Anderson

(57) ABSTRACT

Representing source data with predefined data patterns, or identifying predefined data patterns in source data, where each data pattern includes a unique combination of pattern elements, without comparing every pattern element of each data pattern to the source data. A hierarchical structure of relationships between the data patterns is predetermined in an initialization stage by comparing the data patterns to identify identical pattern elements among groups of the data patterns. Selected node elements in a resulting relationship tree are compared to the source data to determined deviations. The deviations are propagated and accumulated throughout the relationship structure of the tree, and data patterns having the minimum deviation are selected to represent corresponding source data cells. A graphics pipeline preferably is used to determine the deviations and select data patterns in real time.

20 Claims, 20 Drawing Sheets
(3 of 20 Drawing Sheet(s) Filed in Color)

ORIGINAL 640 X 480
IMAGE - 24 BPP,
921600 BYTES 8.574 : 1 COMPRESSED
IMAGE - 2.799 BPP,
107484 BYTES 16.461 : 1 COMPRESSED
IMAGE - 1.458 BPP,
55968 BYTES

REAL TIME DATA MATCHING

FIELD OF THE INVENTION

The present invention generally relates to a method and system for comparing source data to a predefined set of data units, and more specifically, pertains to representing source data by a predefined set of data patterns without comparing every element of every data pattern to every corresponding portion of the source data.

BACKGROUND OF THE INVENTION

It is common to compress data, filter data, recognize patterns in data, and perform other similar functions with data. Often, such functions involve matching source data with a predefined set of data units. The data units may comprise symbols, color tiles, sounds, or other predefined units of data. The data units can be used to represent the source data in a compressed form, or used to perform functions that involve comparing the data units to the source data. For example, it is common to reduce the amount of data needed to represent a source image by comparing a set of predefined pixel maps (of limited number) to cells of the source image and selecting the closest matching pixel map to represent each cell.

The typical approach for comparing the set of pixel maps to the cells of a decomposed source image involves the time consuming process of comparing every pixel map to each target cell in turn. The pixel map that most closely matches a source image cell is selected to represent that source image cell. However, the speed of such an approach is limited by the need for $O(x \times y)$ comparisons, where x is the number of pixel maps in the set, and y is the number of cells in the source image. Specifically, in the conventional approach, each pixel map in the set is compared to the first cell in the source image, the best matching pixel map for the first cell is selected, each pixel map in the set is then compared to the second cell in the source image, and the best matching pixel map for the second cell is again selected. This process must be repeated for every cell in the source image. Clearly, it would be desirable to increase the speed at which such comparisons can be accomplished.

SUMMARY OF THE INVENTION

The present invention provides a method and system for representing source data with predefined data patterns, each of which includes a unique combination of pattern elements, such as pixels. However, the present invention eliminates the need to compare every pattern element of each data pattern to corresponding elements of the source data. Instead, during an initialization that occurs before processing the source data, the present invention predetermines a relationship tree that identifies identical pattern elements disposed at corresponding locations of the data patterns, so that a deviation determined from a comparison to the source data can be propagated to other nodes of the relationship tree that share identical pattern elements. In general, the relationship tree defines a hierarchical structure of relationships employed to minimize the number of actual comparisons that must take place.

The relationships among data patterns that were predetermined are used to selectively determine deviations between unique pattern elements of the data patterns and corresponding elements of the source data in a processing stage. The processing stage involves propagating the selectively determined deviations through the relationship tree to determine final deviations between the data patterns and cells of the source data. The data patterns having the minimum deviation are then selected to represent cells of the source data, which have the same dimensions as the data patterns.

An initialization module predefines the relationship tree with nodes at multiple levels, starting with leaves at a lowest level. The leaves correspond to the predefined data patterns. The initialization module compares the data patterns to each other to determine groups of similar data patterns that have the same pattern elements disposed at corresponding locations within the data patterns. If multiple groups of data patterns have an identical number of the matching pattern elements at corresponding locations, the initialization module preferably breaks the tie by determining which of the multiple groups of data patterns can best be broken up into a pool of data patterns useful for forming other groups of similar data patterns. At each successive level above the lowest level of the relationship tree, the initialization module creates and compares parent nodes to identify identical pattern elements and unique pattern elements among all child nodes on an immediately lower level from the parent nodes. Each node includes a number of masks and maps that define characteristics of, and relationships between corresponding data patterns.

Once the relationship tree has been created, a processing module is employed for processing the source data. The processing module divides the source data into cells having the same dimensions and arrangement as the data patterns. The processing module also preferably rearranges source data elements and pattern elements to utilize a graphics pipeline for real time comparisons and deviation calculations. For example, the processing module groups together elements of source cells from identical locations within a source cell, so that similarly located source cell elements are stored close to each other, thereby speeding access and use as color inputs to the graphics pipeline. Similarly, selected pattern elements of a node are preferably set as pixel shader constants for the graphics pipeline, based on data provided in the relationship tree. The graphics pipeline then performs rendering passes that compare the source cell elements to the selected pattern elements and determine deviations between the source cell elements and the selected pattern elements. A corresponding set of deviations is thus calculated for a node and propagated to related nodes. The processing module may propagate the deviations from the root node down to leaf nodes, or alternatively, from the leaf nodes up to the root node. The propagated deviations are accumulated at each related node to arrive at a final deviation.

The processing module then again uses the graphics pipeline to compare sets of accumulated deviations and select those sets that provide the minimum deviation between a data pattern and a cell of the source data. Thus, a data pattern having the minimum deviation is selected to represent a cell of the data source.

Another aspect of the invention is directed to a memory medium having machine instructions for representing source data with predefined data patterns, as described in further detail below. Still another aspect of the present invention is directed to a system that is used for carrying out the steps of the method described above.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same becomes better understood by reference to the following detailed description, when taken in conjunction with the accompanying drawings, wherein.

Figure 17:
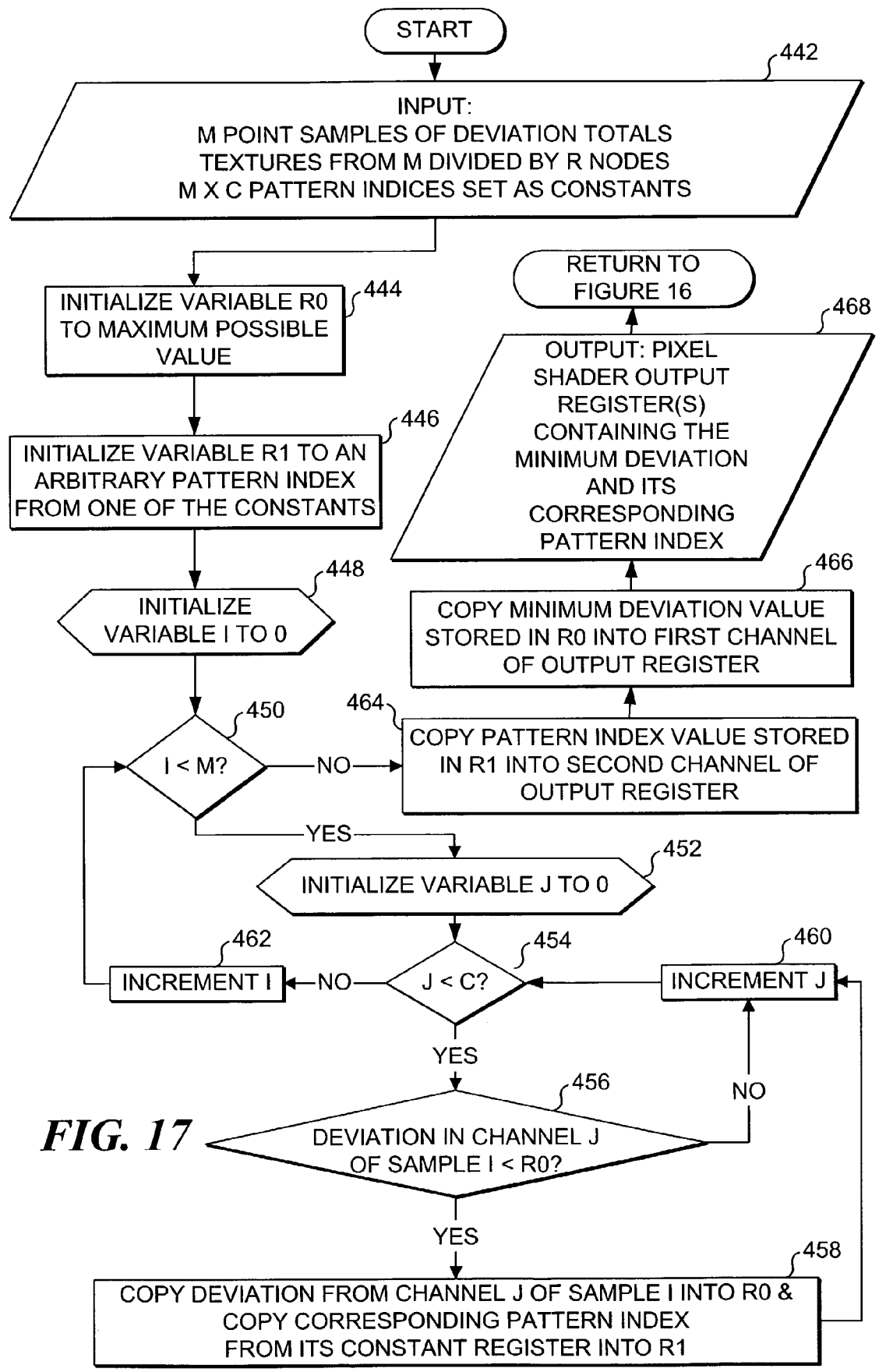
Figure 18:
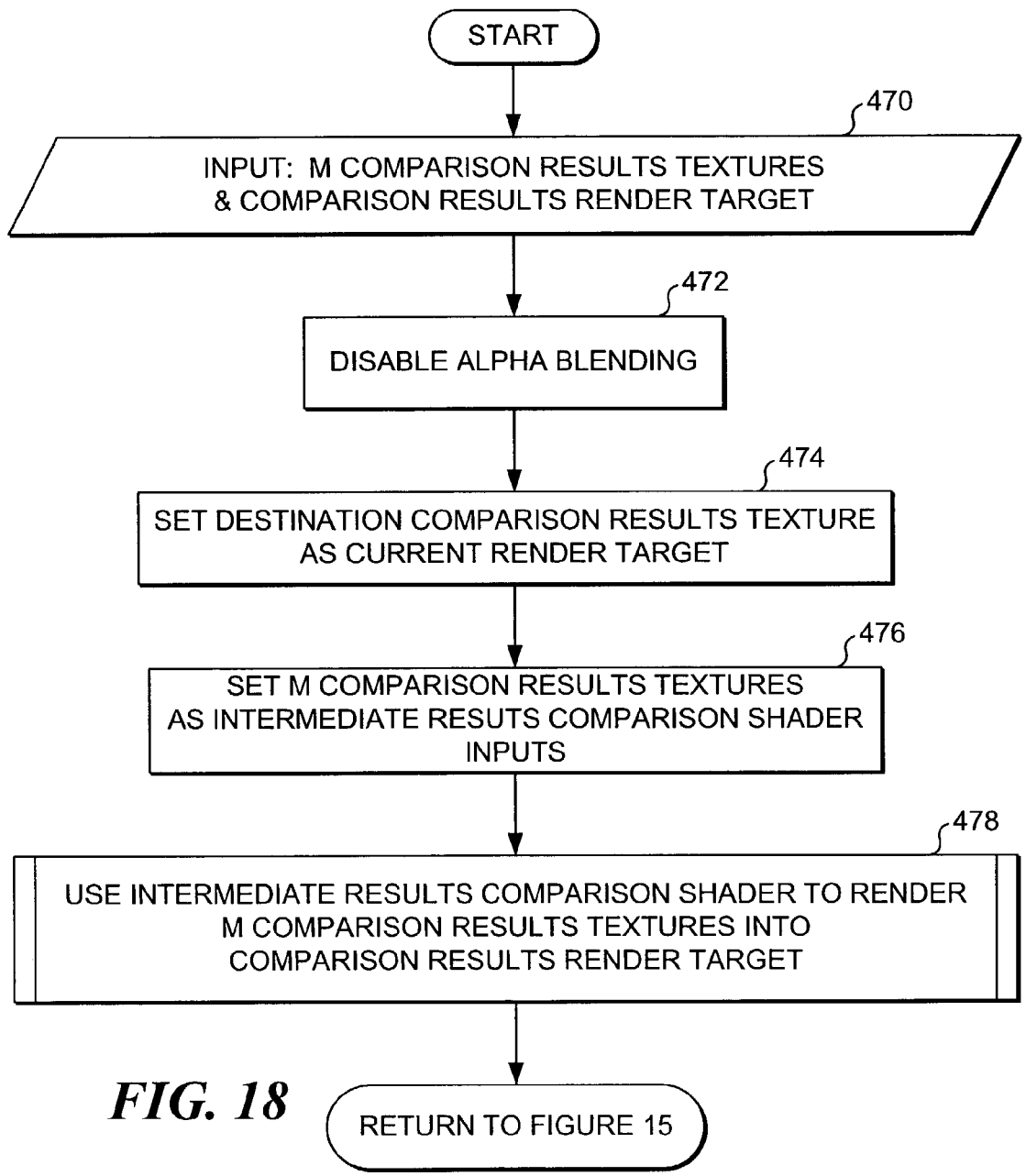
Figure 19:
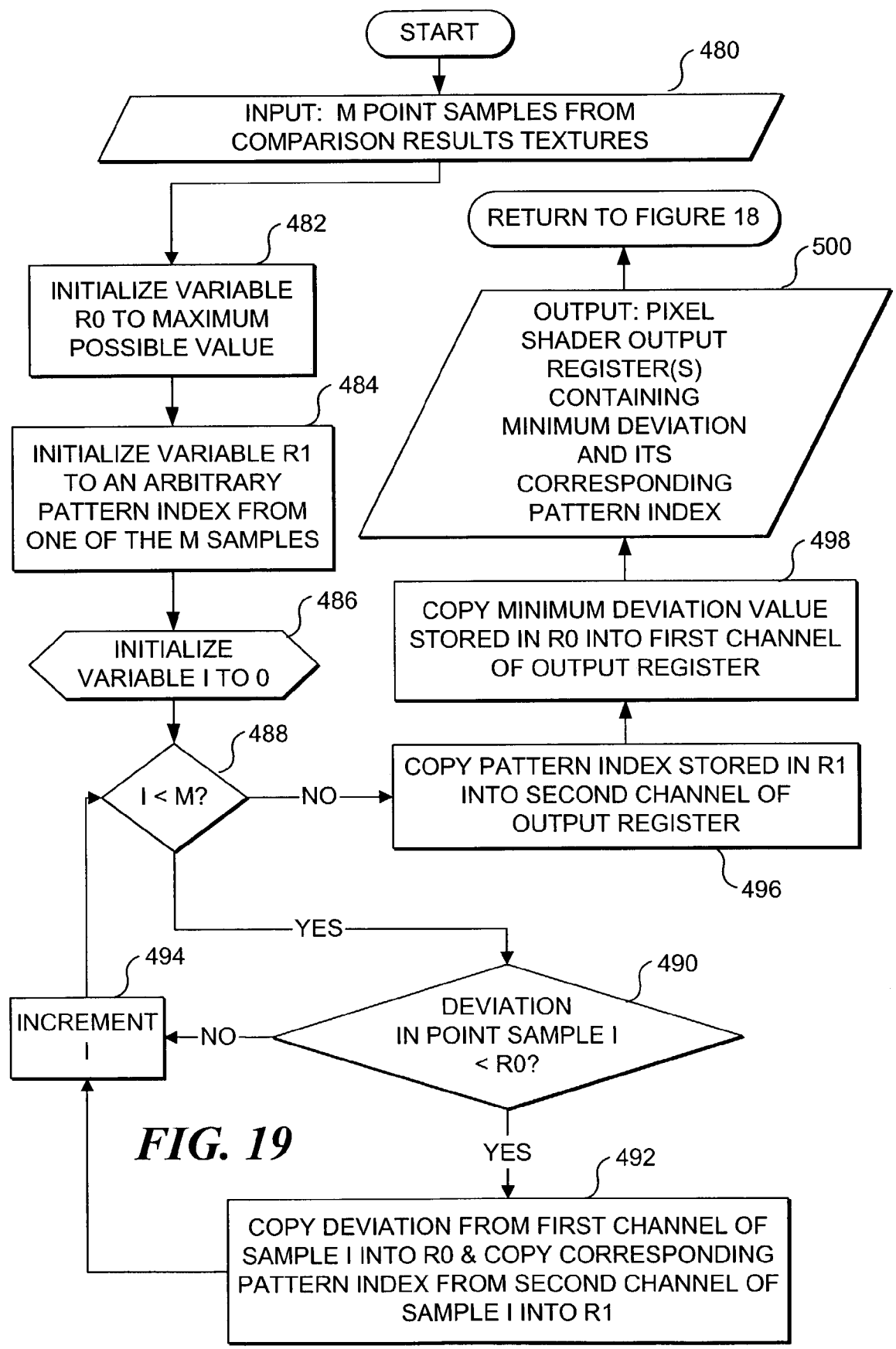
Figure 20:
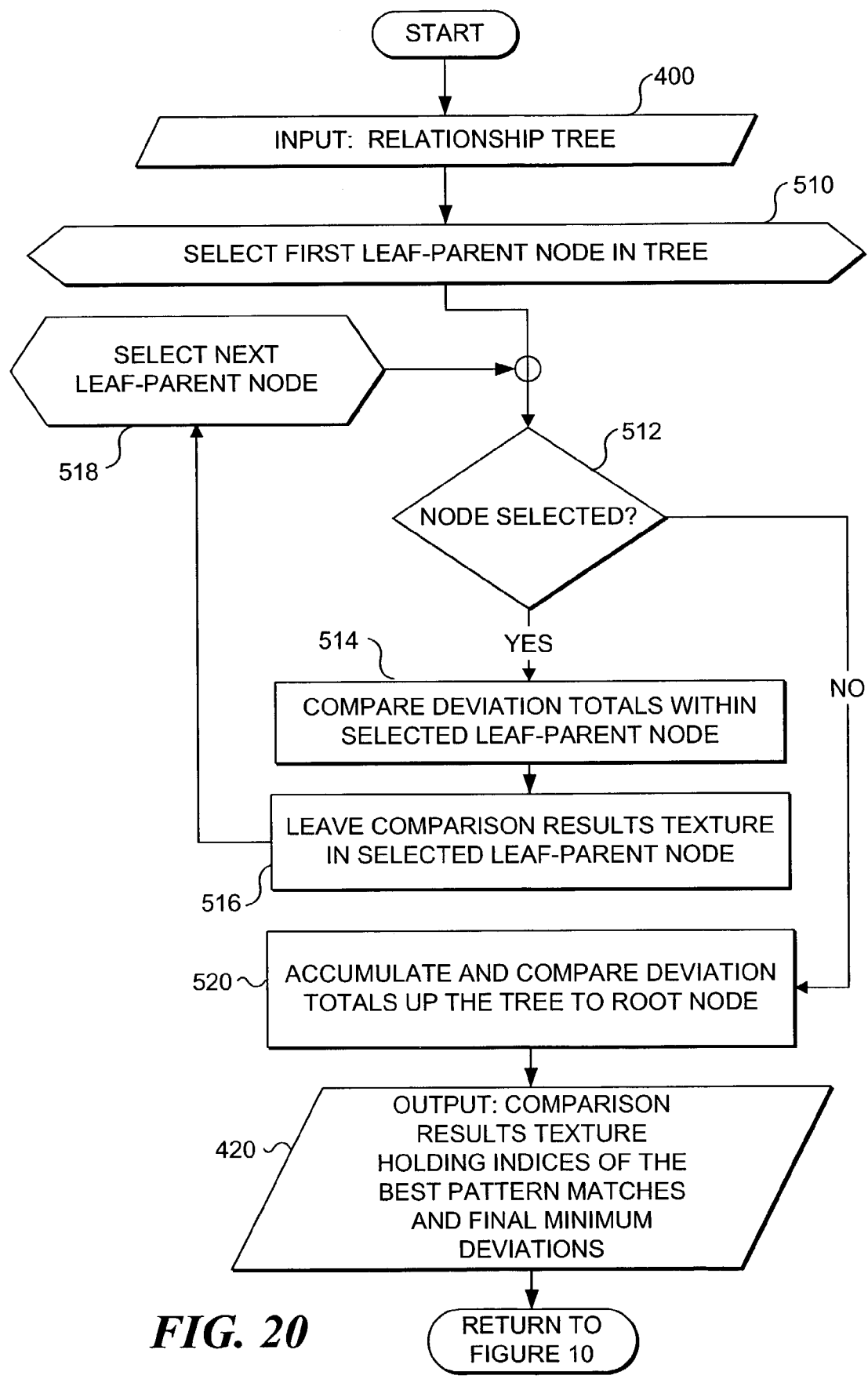

FIG. 17 provides a flow diagram illustrating logic of the leaf-parent comparison shader to determine deviation minimums among one group of leaf-parent nodes;

FIG. 18 is a flow diagram illustrating logic for preparing to execute an intermediate results comparison shader that will compare intermediate deviation minimums between comparison results target textures;

FIG. 19 provides a flow diagram illustrating logic employed by the intermediate results comparison shader to determine deviation minimums from among intermediate deviation minimums; and FIG. 20 is a flow diagram illustrating logic for accumulating and comparing deviation in an interleaved fashion.

DESCRIPTION OF THE PREFERRED EMBODIMENT

The following describes a preferred embodiment for efficiently representing source image frames from a video camera using a predefined set of pixel maps (hereinafter, pixmaps). An exemplary application of this invention described below uses a set of colored pixmaps to perform realtime encoding of the source image frames for streaming over a network. A video camera typically generates a source image frame every 0.016 seconds (i.e., 60 frames per second). The encoding process used in the present invention provides a lossy compression of each of the camera's source image frames within 0.016 seconds, and the compression and speed of the process is sufficient so that the encoded images can be streamed in realtime as the video camera captures the images. An exemplary operating environment for the present invention is described below.

Exemplary Operating Environment

Figure 1:
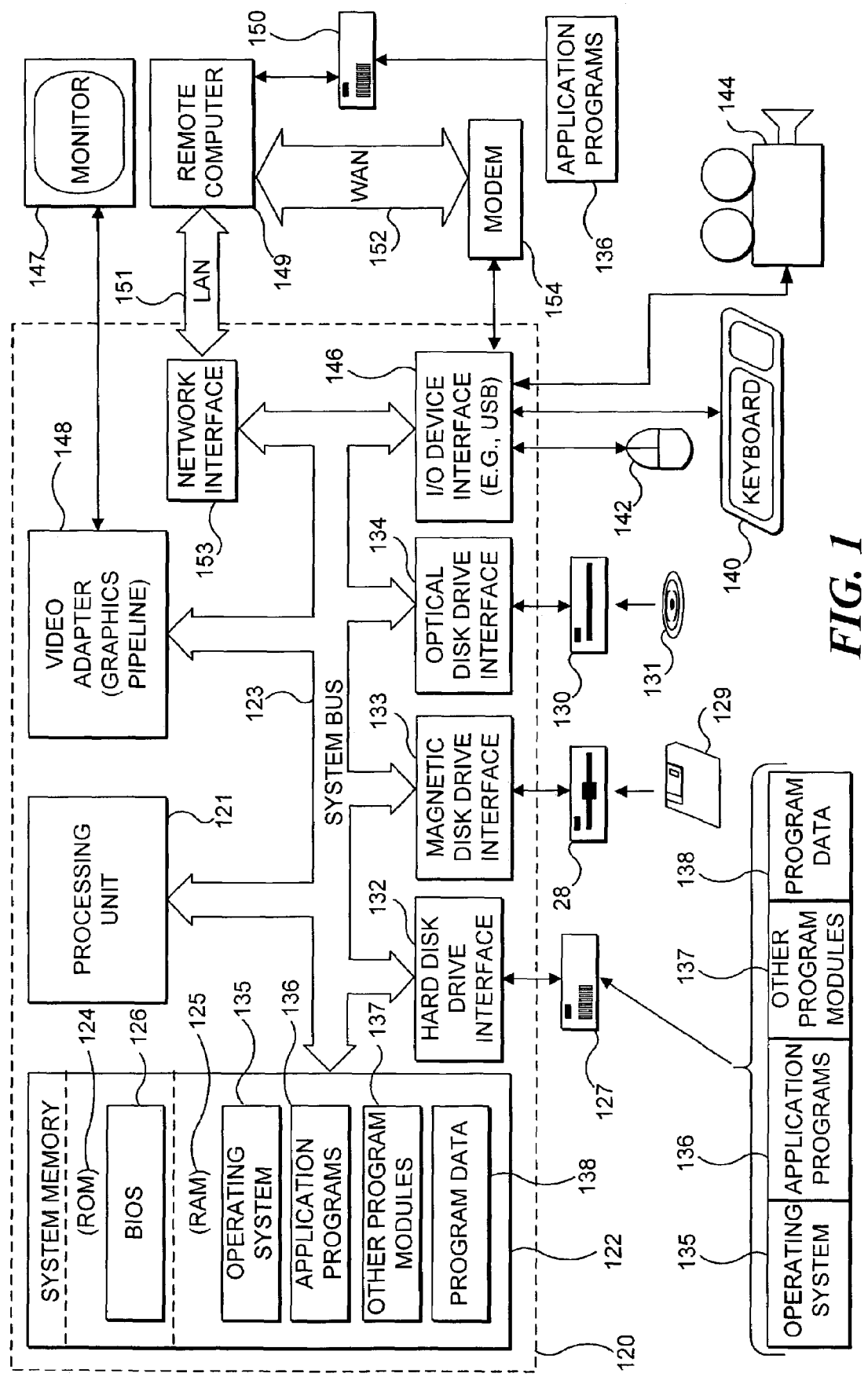
FIG. 1 illustrates an exemplary system for implementing steps of the present invention that includes a general purpose computing device in the form of a conventional personal computer (PC)

FIG. 1 and the following discussion are intended to provide a brief, general description of a suitable computing environment for use in implementing the present invention. Although not required, a portion of the present invention will be described in the general context of computer executable instructions, such as program modules that are executed by a PC. Generally, program modules include routines, programs, objects, components, data structures, etc. that perform particular tasks or implement particular abstract data types. Those skilled in the art will appreciate that this invention may be practiced within other computing system configurations that include mainframe computers, minicomputers, multiprocessor systems, network PCs, pocket personal computing devices, game consoles, TV set-top boxes, hand held devices, video cameras, peripheral devices, digital cell phones, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing steps of the present invention comprises a general purpose computing device in the form of a conventional PC 120. PC 120 is provided with a processing unit 121, a system memory 122, and a system bus 123. The system bus couples various system components, including the system memory, to processing unit 121 and may be any of several types of bus structures, including a memory bus or memory controller, a peripheral bus, and a local bus using any of a variety of bus architectures. The system memory includes read-only memory (ROM) 124 and random access memory (RAM) 125. A basic input/output (BIOS) system 126, containing the basic routines that help to transfer information between elements within the PC 120, such as during start up, is stored in ROM 124.

The PC 120 further includes a hard disk drive 127 for reading from and writing to a hard disk (not shown), a magnetic disk drive 128 for reading from or writing to a removable magnetic disk 129, and an optical disc drive 130 for reading from or writing to a removable optical disc 131, such as a CD-ROM or other optical media. Hard disk drive 127, magnetic disk drive 128, and optical disc drive 130 are connected to system bus 123 by a hard disk drive interface 132, a magnetic disk drive interface 133, and an optical disc drive interface 134, respectively. The drives and their associated computer-readable media provide nonvolatile storage of computer-readable machine instructions, data structures, program modules, and other data for PC 120. Although the exemplary environment described herein employs a hard disk, a removable magnetic disk 129, and a removable optical disc 131, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 129, optical disc 131, ROM 124 or RAM 125, including an operating system 135, one or more application programs 136, other program modules 137, and program data 138.

A user may enter commands and information into PC 120 through input devices such as a keyboard 140 and a pointing device 142. As explained in further detail below, the user may enter image data through a video camera 144 or other type of camera. Other input devices (not shown) may include a microphone, joystick, game pad, satellite dish, scanner, or the like. These and other input devices are often connected to processing unit 121 through an input/output (I/O) device interface 146 that is coupled to the system bus. Output devices, such as a printer (not shown), may also be connected to processing unit 121 through I/O device interface 146 that is coupled to the system bus. The term I/O device interface is intended to encompass each interface specifically used for a serial port, a parallel port, a game port, a keyboard port, a PS/2 port, a universal serial bus (USB) port and/or other communication port. Similarly, a monitor 147 or other type of display device is also connected to system bus 123 via an appropriate interface, such as a video adapter 148, and is usable to display graphical user interfaces, images, Web pages, and/or other information. Video adapter 148 preferably includes a graphics processing unit (GPU) that processes graphics data according to a pipelined architecture, such as that defined by Microsoft Corporation's DIRECTX™ graphics architecture. In addition to the monitor, PCs are often coupled to other peripheral output devices (not shown), such as speakers (through a sound card or other audio interface—not shown).

PC 120 may operate in a networked environment using logical connections to one or more remote sources, such as a remote computer 149. Remote computer 149 may be another PC, a server (which is typically generally configured much like PC 120), a router, a network PC, a peer device, a satellite, or other common network node, and typically includes many or all of the elements described above in connection with PC 120, although only an external memory storage device 150 has been illustrated in FIG. 1. In a networked environment, program modules depicted relative to PC 120, or portions thereof, may be stored in the remote external memory storage device. The logical connections depicted in FIG. 1 include a local area network (LAN) 151 and a wide area network (WAN) 152. Such networking environments are common in offices, enterprise-wide computer networks, intranets, and the Internet.

When used in a LAN networking environment, PC 120 is connected to LAN 151 through a network interface or adapter 153. When used in a WAN networking environment, PC 120 typically includes a modem 154 or other means for establishing communications over WAN 152, such as the Internet. Modem 154, which may be internal or external, is typically coupled directly to the system bus via an internal slot, coupled to the bus via I/O device interface 146, or coupled to the bus via network interface 153. For example, modem 54 may be a broadband modem, such as an ADSL modem, that is coupled to the system bus via a USB interface. It will be appreciated that the network connections shown are exemplary and other means of establishing a communications link between the computers may be used, such as wireless communication and wide band network links.

Exemplary Implementation of the Present Invention

Figure 2A:
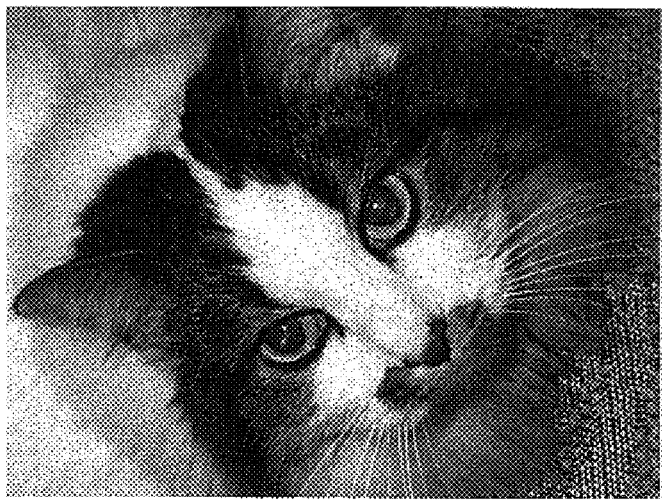
FIG. 2A is a sample source image frame.
Figure 2B:
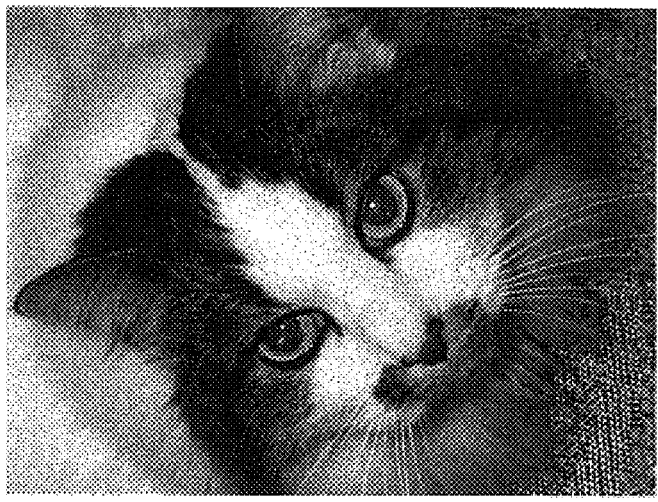
FIG. 2B represents the source image at a compression level of approximately 8.5 to 1.
Figure 2C:
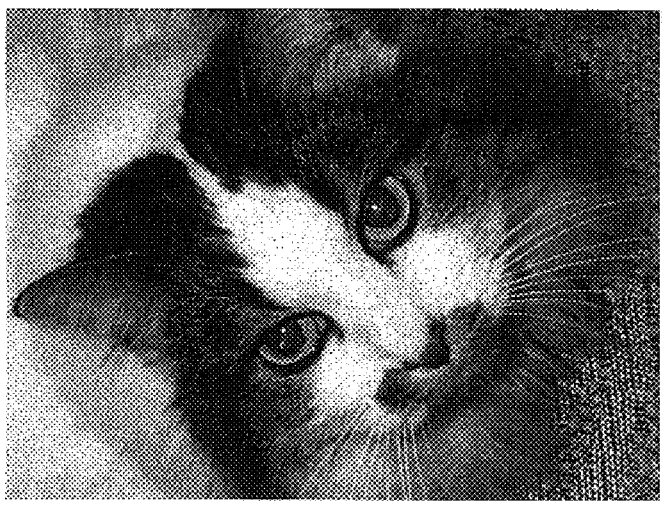
FIG. 2C represents the source image at a compression level of approximately 16.5 to 1.

The embodiment described below converts each source image frame supplied by a video camera into a representation comprising a two-dimensional (2-D) grid of colored pixmaps before a next frame is delivered. For example, a sample source image frame shown in FIG. 2A is converted into two compression levels of pixmap representations shown in FIGS. 2B and 2C, respectively. FIG. 2B is a representation of the source image with 2048 pixmaps that each have a dimension of 3 horizontal pixels by 2 vertical pixels. This set of pixmaps results in a compression level of approximately 8.5 to 1. At this compression level, little difference from the source image is visually detectable. FIG. 2C is a representation of the source image with 256 pixmaps that also each have a dimension of 3 horizontal pixels by 2 vertical pixels. This set of pixmaps results in a compression level of approximately 16.5 to 1. At this compression level, some difference between the compressed and the source images is readily visually detectable, such as in areas along the cat's nose. Those skilled in the art will recognize that a very similar approach can be used to perform realtime encoding of images from a computer game, a virtual reality system, a video editing system, a still camera, a scanner, or other image processing system. The invention can also be applied to compress other forms of data, such as audio data, or a combination of media data. The invention can further be applied to pattern recognition, optical character recognition, American Standard Code for Information Interchange (ASCII) character representations of source data, other glyph representations of source data, and almost any other function wherein source data are represented by a predefined pattern lexicon.

Figure 3:
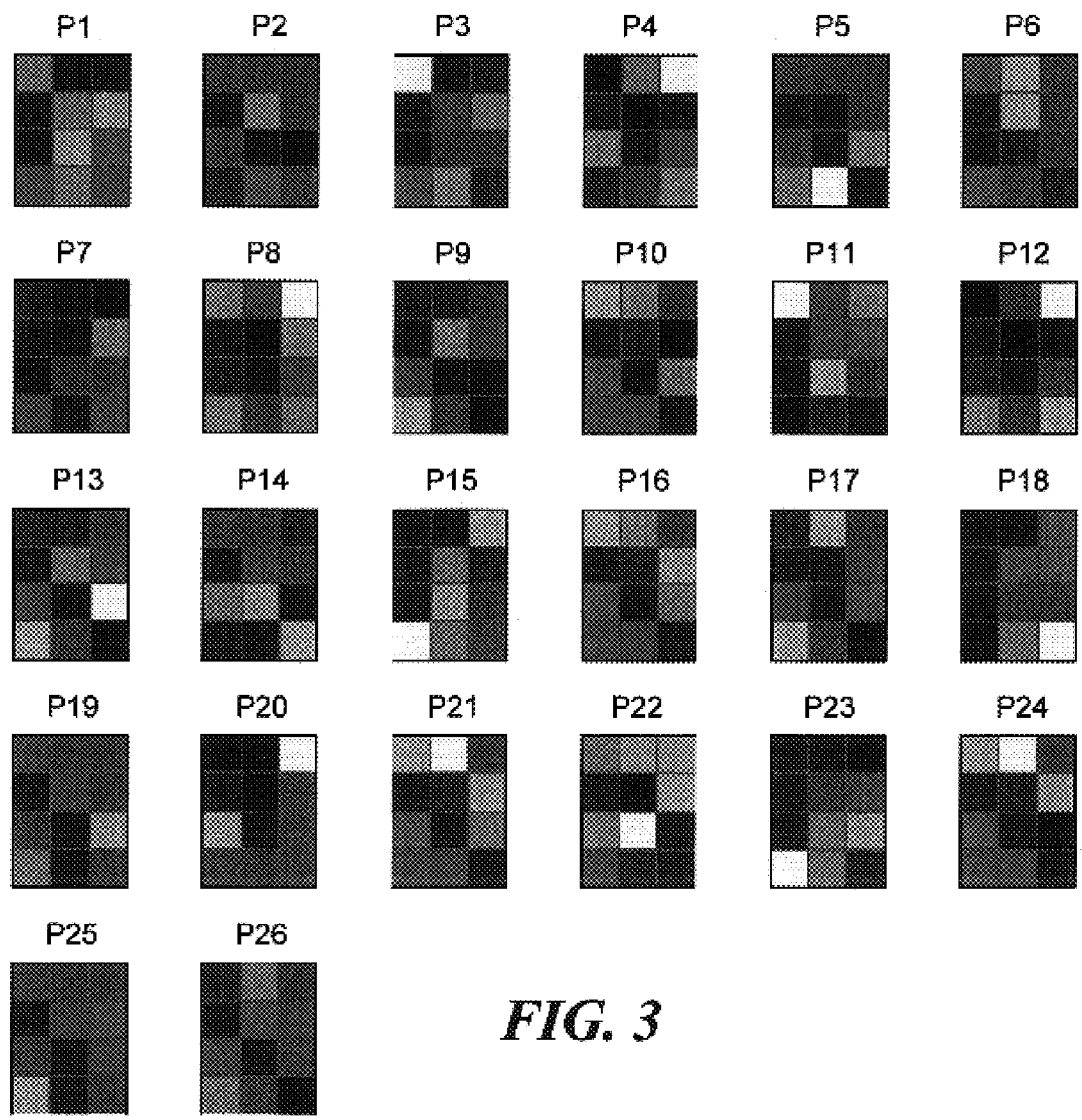
FIG. 3 is a simplified set of pixmaps used to illustrate representing a source image with pixmaps.

As indicated above, the sets of pixmaps used to produce the representations in FIGS. 2B and 2C are relatively large and complex. To facilitate the reader's understanding of the present invention, a simpler set of pixmaps is used to explain the example embodiment for creating the representations of FIGS. 2B and 2C. This simpler set of pixmaps P1 through P26 is illustrated in FIG. 3. Each pixmap comprises a unique color pattern of twelve pixels, with uniform dimensions. Specifically, the pixmaps of FIG. 3 comprise pixmaps with three pixels in a horizontal dimension and four pixels in a vertical dimension. Although simplified for discussion purposes, those skilled in the art will recognize that a pixmap may comprise a much more complex data structure that describes a number of characteristics of a corresponding pixel image of a graphic. For example, a pixmap may include features such as color, image, resolution, dimensions, storage format, and the number of bits used to describe each pixel. Those skilled in the art will also recognize that a set of pixmaps may comprise a set of uniformly colored tiles, a set of textured tiles, a set of alphanumeric characters, a set of symbolic glyphs, a set of pattern images, or a set of other graphic elements.

As noted above, a source image is divided into cells of the same dimensions as the pixmaps in the set that will be used to represent the source image. The pixmap in a set that best matches a cell is selected to represent that cell. To select a pixmap to represent a cell of the source frame, a very fast comparison must be performed between all pixmaps in the set and the cell of the source image. However, to achieve acceptable (i.e., relatively fast) realtime performance, the comparison process of the present invention is preferably implemented in two stages that are quite efficient. In the first stage, a one-time initialization identifies groups of similar pixmaps and identifies deviations between pixmaps, so that the need for individual pixel comparisons to the source image can be minimized. The initialization carried out in the first stage is preferably performed prior to processing any source images, and is preferably performed by an initialization module running on a CPU of a computing device such as the PC described above. In the second stage, the minimum comparisons required are performed to select a closest matching pixmap for each cell of the source image. The comparison process in the second stage is further structured in the context of a graphics rendering pipeline in order to take advantages of inherent parallelism in (and proliferation of dedicated hardware for) the pipeline. Further details of both stages are described below.

Initialization Implemented in the First Stage

Figure 4:
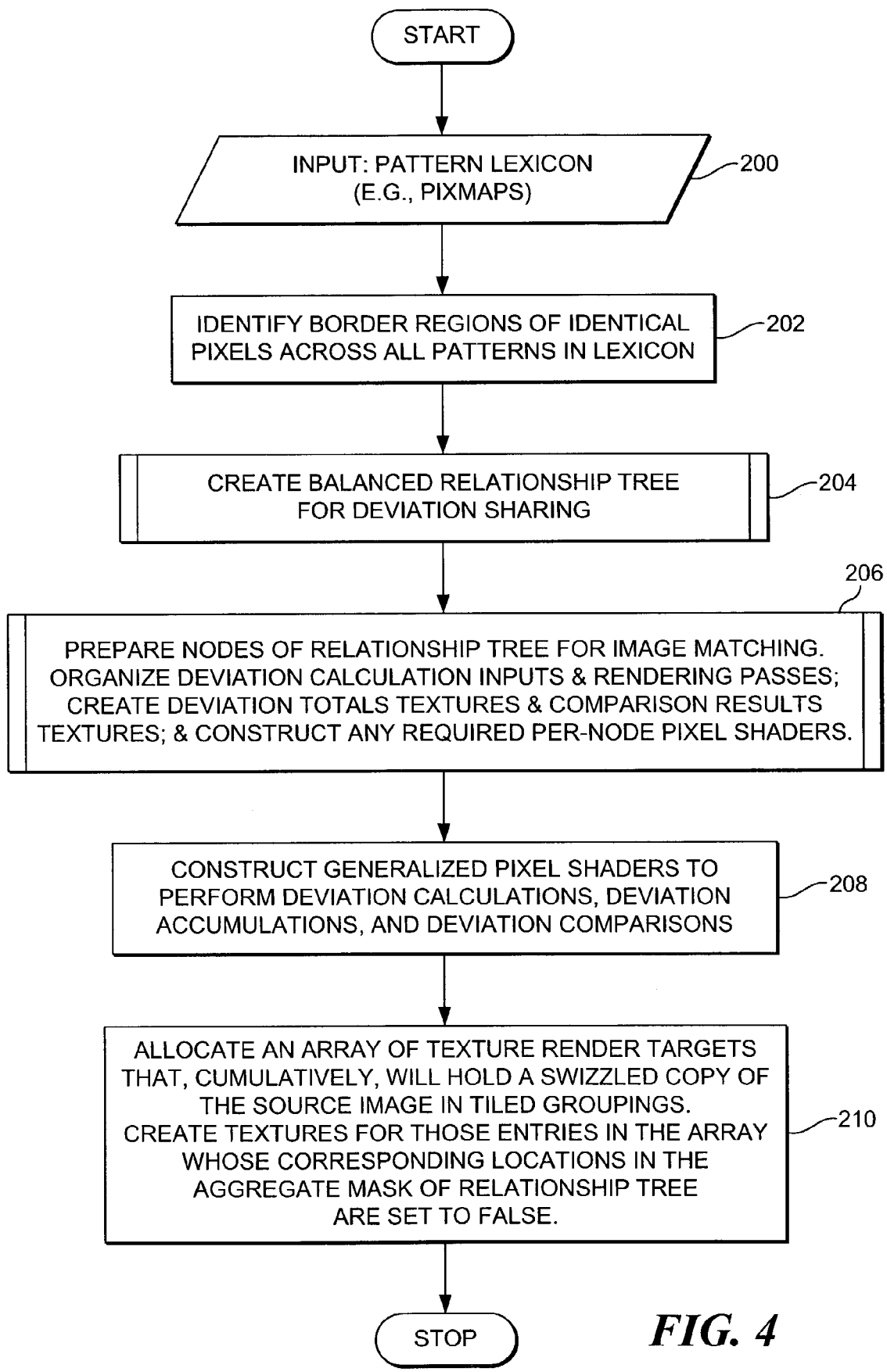
FIG. 4 is a flow chart illustrating an overall logic flow for an initialization stage.

FIG. 4 is a flow chart illustrating an overall flow of the initialization process. Input to the initialization process comprises the set of pixmaps and more generally comprises a pattern lexicon 200, such as the set of pixmaps that will be used to represent the source data that define the source image. At a step 202, the initialization module iterates through all patterns (e.g., pixmaps) in the set to determine whether an inclusive border region exists for the set. An inclusive border region is simply the smallest rectangular region within which all differences in the set will be contained. For example, if each pixmap includes a border of pixels that are the same color, that border identifies a boundary within which lies the inclusive border region. Although the pixmaps in FIG. 3 do not include such a border region, many other pattern lexicons do. For instance, a pattern lexicon of alphanumeric glyphs may include a border region of dark pixels that surround each alphanumeric glyph that is defined by unique combinations of light pixels. More generally, the border region is the smallest rectangular region outside of which the pixels of all pixmaps are identical across the set. This border region is actually identified for memory conservation purposes, rather than to increase computational performance.

Figure 5:
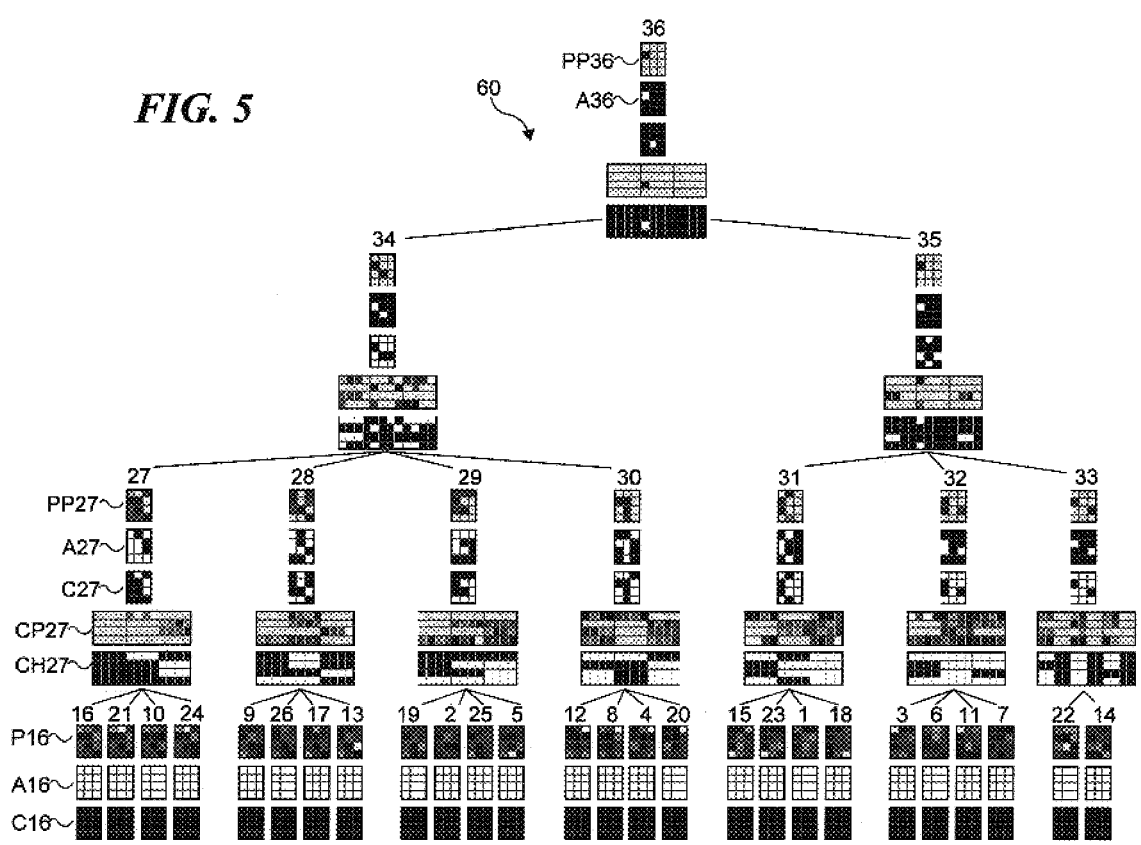
FIG. 5 illustrates a relationship tree for the set of pixmaps shown in FIG. 3.

At a step 204, the initialization module compares all pixmaps to one another and constructs a relationship tree of nodes to represent the relationships between pixmaps that most closely match other pixmaps in the set. FIG. 5 illustrates a relationship tree 60 for the set of pixmaps P1–P26 shown in FIG. 3. The structure of relationship tree 60 represents multi-level relationships between groups of pixmaps P1–P26 that comprise a tree of nodes 1–36, the details of which are discussed in greater detail below. Relationship tree 60 comprises a balanced n-tree, where n is determined by multiplying the number of color channels available in each pixel of a render target image in a graphics pipeline, c, by a number of simultaneous render targets, r, supported as individual color output destinations from a pixel shader. Standard render targets typically comprise 32-bit pixels arranged in four color channels, including a separate channel for each of the red, green, blue, and alpha color components. Thus, the number of color channels, c, is typically 4. Also, most graphic pipelines currently support only a single 4-color-channel render target (although a few newer graphic pipelines support more than one simultaneous render target). Thus, the number of simultaneous render targets, r, is typically 1. Accordingly, n is equal to 4 times 1, or 4. Consequently, the relationship tree will take the form of a balanced quad tree for most current implementations (i.e., a 4-tree). However, those skilled in the art will recognize that additional color channels and/or render targets may be used, resulting in more complex relationship trees. Further details regarding creation of the relationship tree are described below with regard to FIGS. 6–11.

At a step 206 of FIG. 4, the initialization module prepares the nodes of the relationship tree for matching the pixmaps with a source image by predefining inputs for deviation calculations, creating sets of deviation totals (sometimes referred to as deviation totals textures), creating sets of comparison results (sometimes referred to as comparison results textures), constructing pixel shaders for any individual nodes that need them, and performing other functions to pre-organize data for use during the processing stage. Further details of this step are described below in regard to FIG. 9.

At a step 208 in FIG. 4, the initialization module constructs generalized pixel shaders composed of instructions that can be applied without alteration to all nodes. Pixel shaders typically control color and alpha-blending operations, control texture addressing, and otherwise generate pixels that are written to a render target. However, the pixel shaders will be used during the processing stage to perform deviation calculations, deviation accumulations, and deviation comparisons among pixels. Depending on the implementation of the graphics pipeline and the capabilities of back end processing, it may not be possible to construct general pixel shaders independent of individual nodes in the relationship tree. For some pixel shader implementations, pixmap pixel inputs can be set as pixel shader constant values. However, some pixel shader implementations embed pixel shader constants within the pixel shader program itself, rather than in independent registers. Also, pixel shader implementations that do not support branching require separate pixel shader programs, depending on the number of pixmap pixel inputs to a rendering pass, and depending on whether bilinear-filtered comparisons are to be made. In such instances, it is preferable to construct separate pixel shaders for each possible case during the one-time initialization of the first stage, rather than rebuild the pixel shaders during every GPU execution frame. Additional information regarding pixel shaders may be obtained from developer sources, such as http://msdn.microsoft.com/library/default.asp?url=/library/en-us/dx8_c/directx_cpp/Graphics/ProgrammersGuide/GettingStarted/Architecture/pixelshader.asp. In any case, although the creation of the pixel shaders is performed during the initialization implemented in the first stage, application of the shaders during the processing stage is discussed below.

At a step 210, the initialization module allocates an array of pointers to render targets (which are also sometimes referred to as textures) and creates render targets for certain entries of the array. Specifically, the initialization module allocates an array of pointers to off-screen render targets to store select pixels from a source image in tiled groupings.

Henceforth these render targets shall be referred to as tile textures. In general, the tile textures will be used to provide improved pixel reference locality for coherency in a texture cache. (Note that a texel is the smallest addressable unit of a texture map and can be applied to one or more pixels.) The size of the array equals the number of pixels contained within the inclusive border region of the pixmap set determined above. In this exemplary embodiment, the inclusive border region comprises an entire pixmap. The dimensions of an individual tile texture within the array is defined by the following expression:

Tile texture width=(Source image width+Pixmap width−1)/Pixmap width

Tile texture height=(Source image height+Pixmap height−1)/Pixmap height

Details regarding populating these tile textures during each execution frame are discussed below with regard to the processing stage. In some cases, however, a tile texture in the array need not be created, because the tile texture will not be used during the processing stage. Those cases occur when an entry of the array corresponds to a TRUE value of an entry in an aggregate mask that is built during creation of the relationship tree. Details regarding use of the aggregate mask are provided below as part of further discussion on creating the relationship tree.

Creating Relationship Tree

Figure 6:
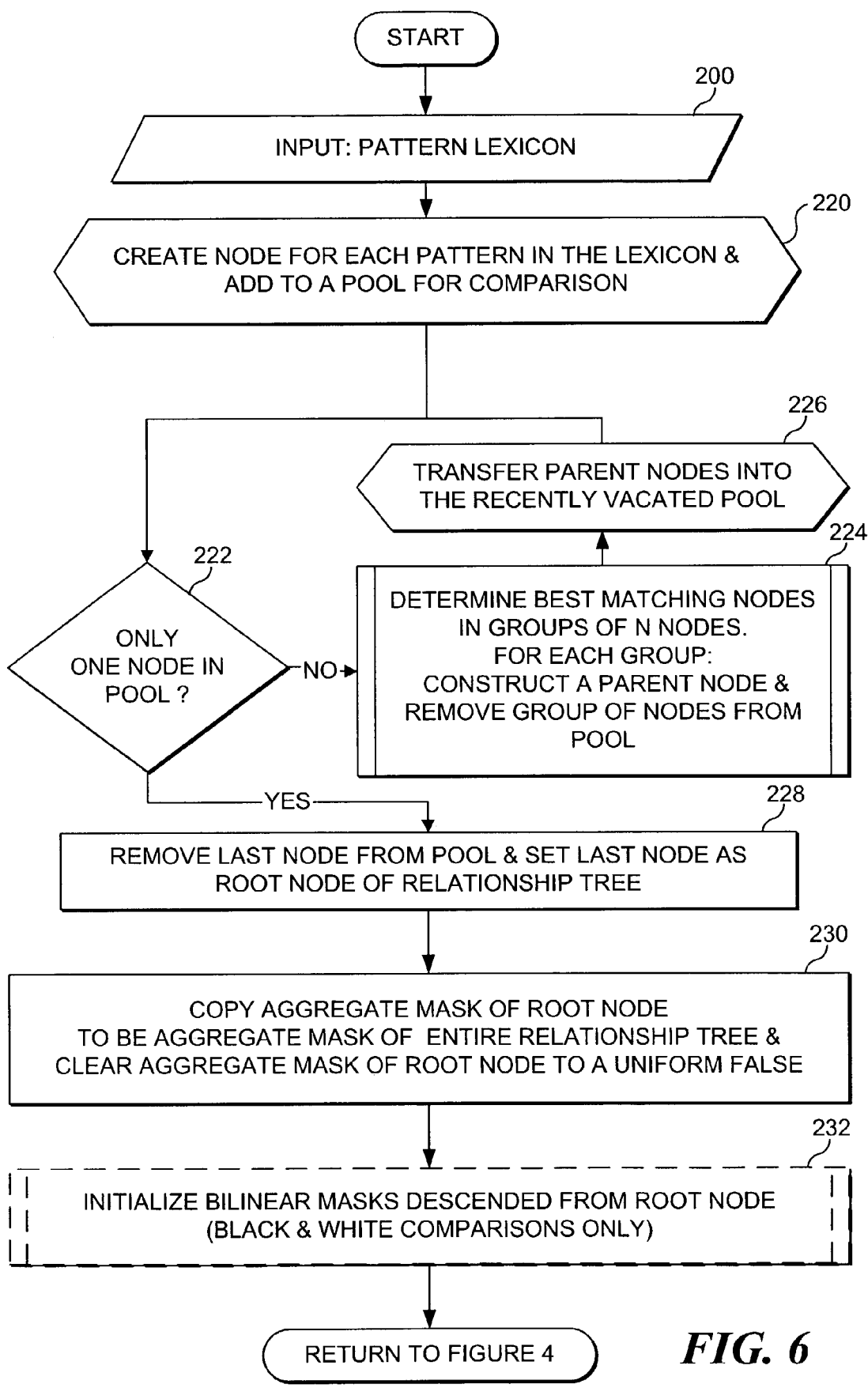
FIG. 6 is a flow diagram illustrating overall logic for creating a relationship tree.

FIG. 6 is a flow diagram illustrating the overall logic for creating a relationship tree. At a step 220, the initialization module accesses pattern lexicon 200 (e.g., the set of pixmaps), and creates a pool of nodes corresponding to the pixmaps. As illustrated in FIG. 5, a number of structures are formed when each node is created. The relationship tree itself is constructed bottom-up, starting from the leaves and progressing up to the root. Thus, at step 220, the initialization module starts creating nodes for the leaves. Each leaf node includes one of the pixmaps from the set of pixmaps, an aggregate mask, and a coverage mask. For instance, leaf node 16 includes pixmap P16, an aggregate mask A16, and a coverage mask C16. The aggregate masks and coverage masks are illustrated as 2-D arrays having the same dimensions as the pixmaps. An entry in an aggregate mask array and a coverage mask array relates directly to a pixel at the same location in the corresponding pixmap. Specifically, an aggregate mask in a node is a Boolean data structure that is used to identify pixels that match one another for all pixmaps in the node's corresponding child nodes (and, more generally, for all pixmaps in all leaf nodes belonging to the node's sub-tree). However, because leaf nodes have no children, their aggregate masks are set uniformly to TRUE (illustrated by white spaces). Conversely, a coverage mask is a Boolean data structure that defines pixels of a pixmap for which a deviation must be calculated and passed down to one or more children. Again, because leaf nodes have no children, their coverage masks are set uniformly to FALSE (illustrated by black spaces).

Having created a pool of leaf nodes, the initialization module begins grouping the leaf nodes and performing a recursive process to build parent nodes. This recursive process updates the contents of the pool as parent nodes are created. The entire relationship tree will be complete when all levels of parent nodes are created and related up to a single root node. To check for completion, the initialization module recursively determines, at a decision step 222, whether the pool has only one node (i.e., the root node). If the pool comprises more than one node, the initialization module must determine another level of parent node(s). Specifically, the initialization module determines groups of similar nodes and creates corresponding parent nodes, at a step 224. For example, the initialization module determines that the pixmaps of nodes 16, 21, 10, and 24 are similar, and the initialization module creates node 27. When a parent node is created, the corresponding group of child nodes is removed from the pool. The pool will be empty when all parent nodes are created for a level of the relationship tree. Further detail about step 224 is described below with regard to FIGS. 7 through 9.

At a step 226, the initialization module repopulates the empty pool with the parent nodes that were created in step 224. Control then returns to decision step 222 to determine whether only one node is left in the pool (i.e., the root node) or whether another level of parent nodes must be created in the relationship tree.

Once all of the parent nodes have been created, and only one node remains in the pool, the initialization module removes this last node at a step 228 and establishes this last node as the root node of the entire relationship tree. At a step 230, the initialization module then creates an aggregate mask to represent the entire relationship tree. This tree aggregate mask is simply a copy of the aggregate mask of the root node created during creation of the root node. As indicated above, the aggregate mask of a node identifies pixels that match one another for pixmaps in all corresponding leaf nodes belonging to the node's sub-tree. Looking at this relationship from the perspective of a child node, elements of the aggregate mask of the child node that indicate matches (i.e., those elements set to TRUE in the aggregate mask of the child node), inherently indicate elements of a corresponding ancestor node that will provide a deviation value to the child node during the processing stage. The deviation value comprises the difference between a pixel of a pixmap and a pixel of a cell of the source image. Thus, when a pixel of an ancestor node is later compared to a pixel of a cell of the source image during the processing stage, the deviation value determined can be propagated down to all descendent nodes that have a matching pixel at the corresponding pixel location of the ancestor node without the need to make a comparison at each child node. In other words, a child node inherits deviation from its parent for all matching pixels in the aggregate mask.

The root node, however, does not have a parent node from which to inherit deviation. At the level of the root node, any elements set to TRUE when the root's aggregate mask is created indicate those pixels that match between all pixmaps in the tree (and the original pattern set). Thus, a copy of the aggregate mask created for the root node is stored as a separate aggregate mask of the entire tree. Because the TRUE elements of the root node aggregate mask represent those pixels that match between all pixmaps in the tree, the deviations from corresponding pixels in the source image (as might be determined by comparisons in the processing stage) will be a constant for all pixmaps in the set, and do nothing to further differentiate one pixmap from another in terms of which best matches a source image cell. Thus, the aggregate mask of the root node can then be cleared by setting all elements to a uniform FALSE.

Although the originally created aggregate mask of the root node is not used directly by the root node, the creation and copying of the aggregate mask of the root node is not a waste of processing. The copy of the mask that now comprises the relationship tree's aggregate mask not only indicates those pixels of the source image that need not be compared at all to any pixmaps in order to find the best matches during the processing stage, the relationship tree's aggregate mask also identifies those source image pixels that are exempt from a swizzling operation during a frame rearrangement operation described below with regard to the processing stage. Further, because the targets of said swizzling operation are the tile textures allocated at step 210 of FIG. 4, the relationship tree's aggregate mask is used to determine which tile texture pointer array entries for which the initialization module will create a tile texture (saving on the memory required for the processing stage).

At an optional step 232, the initialization module recursively walks down the relationship tree from the root node to the leaf nodes to initialize a bilinear mask for each node of the relationship tree. A bilinear mask of a node is used to provide an additional optimization that applies only when comparing black and white pixmaps with a black and white source image. Further details regarding the bilinear masks and their initialization are discussed below with regard to FIG. 8. Having created a complete relationship tree and initialized necessary masks, control returns to the process of FIG. 4 to continue with the remainder of the initialization for the first stage.

Details of Specific Steps in the Initialization Process

Figure 7:
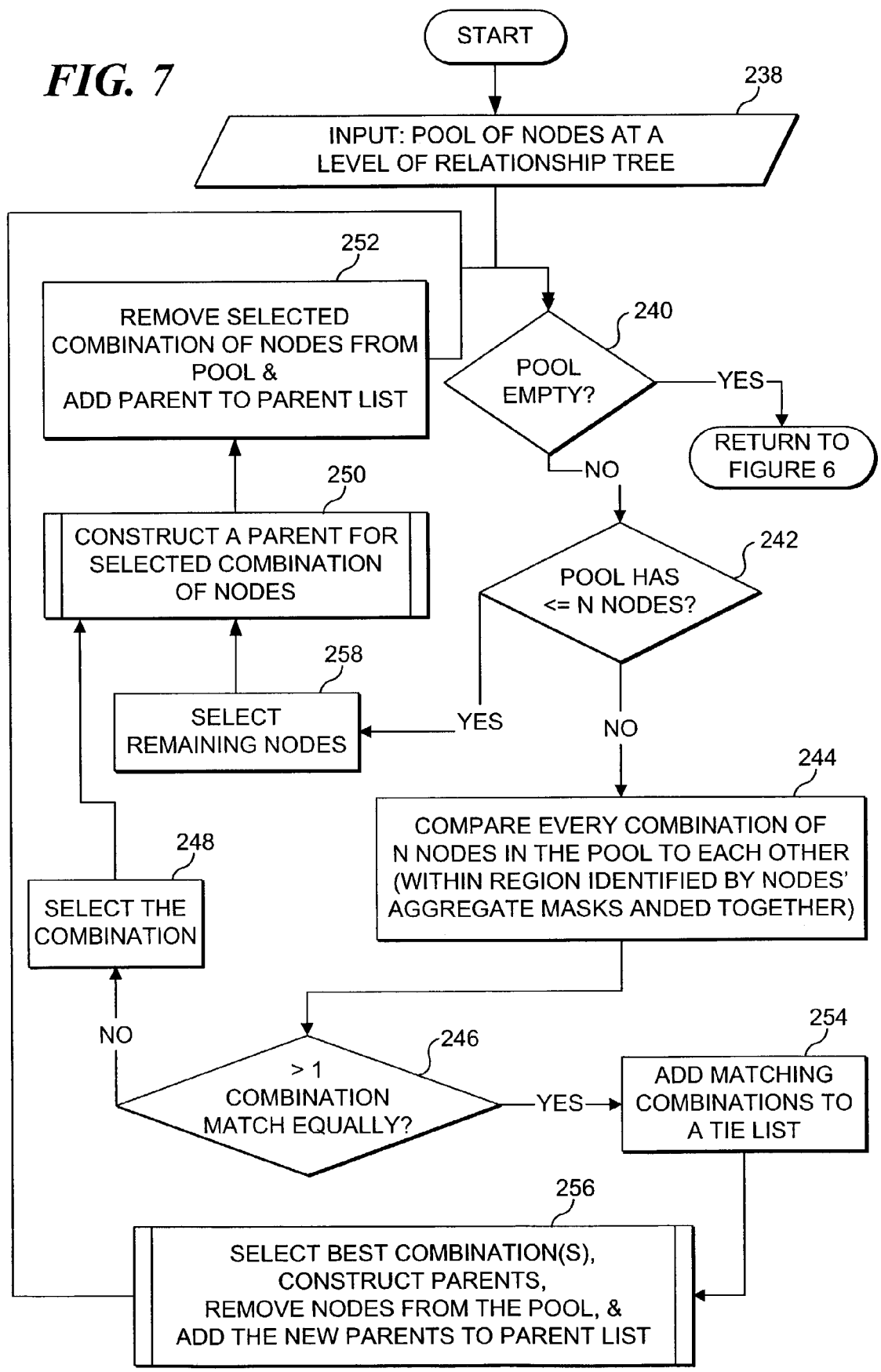
FIG. 7 is a flow diagram illustrating logic for determining groups of similar nodes and creating corresponding parent nodes in the relationship tree.

Further details are now provided for some of the steps described above. FIG. 7 is a flow diagram illustrating logic for determining groups of similar nodes and creating corresponding parent nodes in the relationship tree, and provides details of step 224 in FIG. 6. To begin the logic of FIG. 7, a pool 238 of nodes is evaluated at a decision step 240, to determine if the pool is empty. Recall that pool 238 comprises the leaf nodes, while the initialization module groups similar pixmaps at the lowest level of the relationship tree. At middle layers of the relationship tree, pool 238 will comprise parent nodes of the level being processed. When all parent nodes have been created for grouped nodes of a level, control returns to the logic of FIG. 6 to prepare for the next level of the relationship tree. However, when pool 238 is not empty, the initialization module determines, at a decision step 242, whether n or less nodes remain in the pool.

When more than n nodes exist in the pool, the initialization module groups nodes with similar pixmaps, at a step 244, and determines the group having the greatest number of matching pixels. Because this step is part of the initialization in the first stage that is completed before any source image is evaluated, a brute force, exhaustive approach is taken to group nodes and determine the group having the greatest number of matching pixels. Specifically, the pixmaps of every possible combination of n nodes are compared to each other on a pixel-by-pixel basis. This comparison process creates a number of groups, each with an associated number of pixels that match across the group. This brute force grouping process is clear, but lengthy, for the original set of nodes that make up the leaf nodes. However, the grouping process can be improved for pools of nodes at intermediate levels of the relationship tree. Before comparing pixels of a combination of n pixmaps, the aggregate masks of the nodes in a given combination are ANDed together. The resulting mask identifies those pixels that need to be compared, thereby reducing the number of pixel comparisons that are made. Unfortunately, this pre-masking process cannot be applied at the leaf-level nodes, because the aggregate mask of each leaf node is uniformly set to true. Thus, ANDing leaf-level nodes would still result in a uniformly true aggregate mask, indicating that all pixels must be compared.

After groups of matching nodes are identified, the initialization module determines, at a decision step 246, whether more than one group has the same number of matching pixels. If only one group exists with the highest number of matching pixels, the initialization module selects that group, at a step 248. At a step 250, the initialization module creates a parent node, based on the nodes of the selected group. Further details regarding creating a parent node are provided below with regard to FIG. 8. In any case, the nodes of the selected group are the children of the created parent node and are treated as siblings in the relationship tree. Once a parent node is created, the nodes of the selected group are removed from the pool of nodes, at a step 252. Control then returns to decision step 240 to determine if the pool of nodes is now empty. If not empty, the smaller pool of nodes is processed as described above, to determine a next group of matching nodes and create a corresponding parent node.

In the event that multiple groups are determined to have an equal number of matching pixels, these equally matching groups are added to a tie list, at a step 254. Once the tie list has been formed, an initial pass is made over the tie list to remove all isolated groups. Those groups comprising unique nodes that are not shared by any other groups in the tie list can be immediately removed from the tie list. The initialization module can also immediately create a parent node for these unique nodes, and add the parent to the relationship tree. The group of unique nodes can then be added to the relationship tree as a set of sibling nodes.

However, not all groups have unique, independent nodes; some groups may share nodes. For example, a first group may contain nodes A, B, C, and D, while a second group contains nodes A, B, F, and G. Because nodes A and B are shared by the first and second groups, the two groups cannot be independently removed from the tie list and added to the relationship tree. Under these circumstances, the initialization module performs a tie breaking operation, at a step 256, to select a "best" group from the overlapping groups, and then creates a corresponding parent node for the selected group. The selected group is removed from the pool and added to the relationship tree, while the groups overlapping the selected group are removed from the tie list. Remaining overlapping groups in the tie list are recursively processed in the same manner to find the next best groups to select until the tie list is empty.

To select a best group from the tie list, the initialization module searches the list for a group that will cause the least number of break-ups to other groups in the list. A group that shares nodes with other groups will be broken up if one of the other groups is selected. For instance, if the first group above were selected, nodes A and B would no longer be available to the second group, so Nodes F and G would be "orphaned." Nodes A, B, C, and D would become siblings in the relationship tree and nodes F and G would remain in the pool to be later grouped with other nodes as illustrated by step 244 of FIG. 7.

Thus, groups are selected in such a way as to both minimize orphaned nodes and to ensure that nodes which do become orphaned will provide the best matches in subsequent groupings in the pool. If a single group is found to meet these criteria, that group is selected. If multiple groups cause the least number of break-ups, each of these groups will be evaluated in turn, to evaluate the suitability of the orphans resulting from their selection in future pool groupings. The group leaving the best orphans for future groupings will be selected. To accomplish this evaluation for each candidate group, the initialization module identifies all groups in the tie list that share nodes with the candidate group. All nodes in those groups that are not present in the candidate group (i.e., orphans) are then identified. Each orphan is combined in every possible combination of n with the remaining nodes in the pool to find the combination with the greatest number of matching pixels. The total number of pixel matches from the winning combination is added to totals from winning combinations of the other orphans. This sum is assigned to the group that produced the orphans. The group with the highest sum will be the group whose consequent break-up will yield the best orphans for later groupings.

If the pattern lexicon comprises pixmaps with only black and white pixels, the initialization module can perform an additional test to select a best group, in the unlikely event of a tie in sums between one or more groups. This additional test considers a number of non-overlapping 2×2 pixel regions that match between all n pixmaps in a group, wherein the 2×2 pixel regions are of a uniform color. Specifically, all pixels in the 2×2 pixel regions are all black or all white. The group with the greatest number of non-overlapping 2×2 pixel regions is selected and added to the relationship tree. The motivation for this additional test will become apparent in light of further discussion below regarding bilinear interpolation operations in texture filtering.

If, after all tests have been performed, no clear winner has been identified, a group may be arbitrarily selected from the groups still in the tie list. The tie list will be processed through this cycle of selecting the best group from available groups, removing that best group from the tie list, adding that best group to the relationship tree along with a parent node, removing all other groups sharing common nodes, leaving orphaned nodes in the pool, and repeating until the tie list is empty.

When n or fewer nodes remain in the pool, these remaining nodes are selected as a group, at a step 258. A parent node is created for this final group, and these last nodes are removed from the pool, thereby emptying the pool. At that point, control returns to the process of FIG. 6 to add the newly created parent node(s) to the pool and begin the process again for building another level of parent nodes or the root node.

Creating a Parent Node for the Relationship Tree

Figure 8:
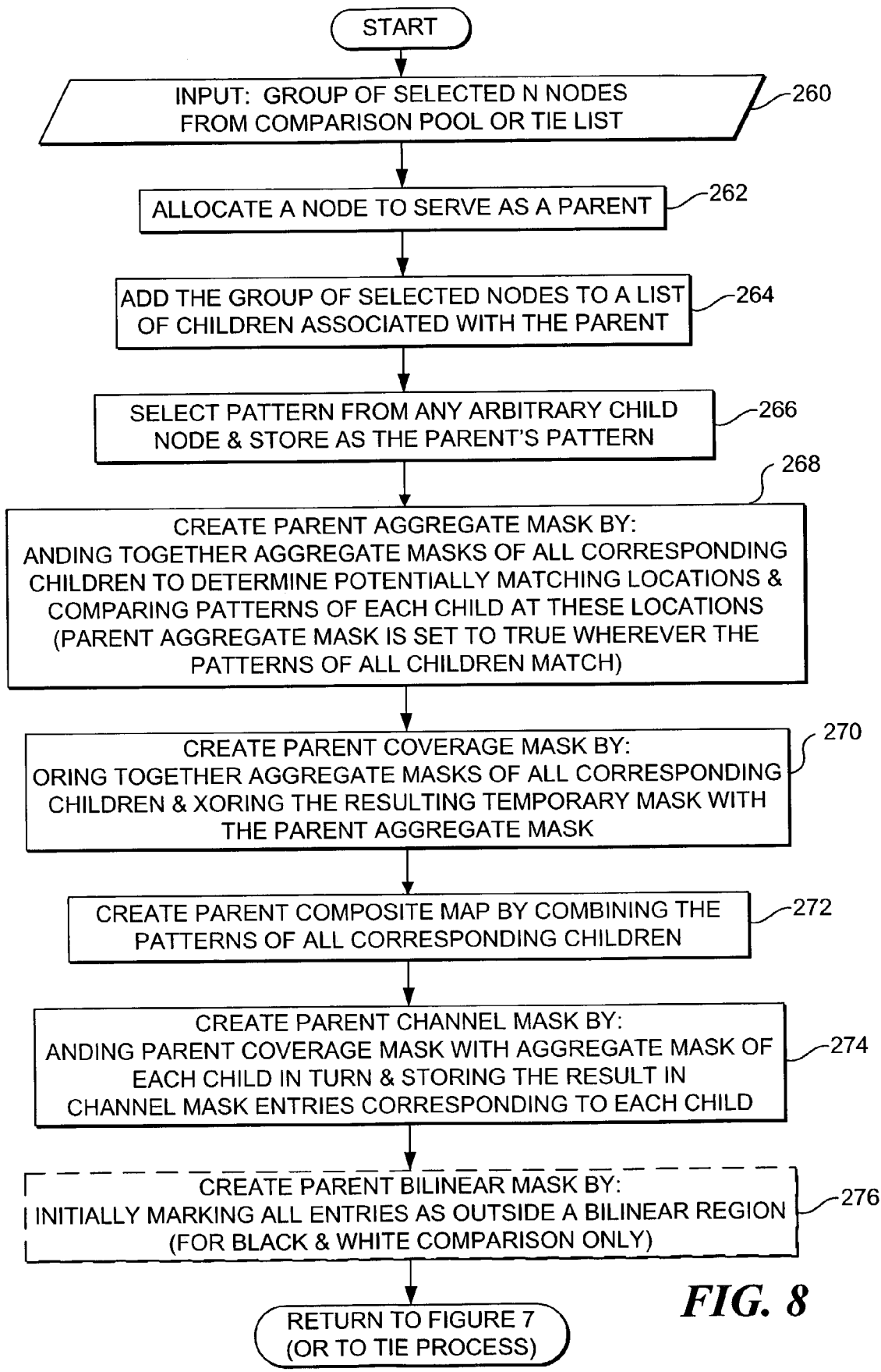
FIG. 8 is a flow diagram illustrating logic for creating a parent node of the relationship tree from a group of nodes selected from the pool or from a group selected from a tie list.

Additional details are now provided for creating a parent node, as introduced at step 250 of FIG. 7. FIG. 8 is a flow diagram illustrating logic for creating a parent node of the relationship tree from a group 260 of n nodes selected from the pool or from a group selected from the tie list. At a step 262, the initialization module allocates memory for a parent node and initializes a data structure for the parent node. At a step 264, the initialization module associates the nodes of the selected group as children of the parent node.

At a step 266, the initialization module selects a pixmap of one of the corresponding child nodes to be the pixmap of the parent node. Specifically, the parent pixmap is simply a pointer to, or copy of, any pixmap found in one of the child or leaf nodes of the parent's sub-tree. For example, as shown in FIG. 5, pixmap P16 of child node 16 is selected to define a parent pixmap PP27 for a parent node 27. It is irrelevant which child node's pixmap is selected for a parent node, because the pixmaps of all corresponding child nodes are considered to match one another within the context of the parent node. Parent pixmaps are not selected to represent cells of the source image, only leaf pixmaps P1 through P26 are used to represent cells of the source image. More specifically, a parent pixmap retains the pixel values (e.g. color values) of those pixels that are identical for all corresponding children. At pixel locations that do not have identical pixel values, the corresponding pixels of the parent pixmap are never referenced, so the pixel values of the parent in those locations may be set to any arbitrary color value (e.g., as depicted by grayed out pixels). In this way, the initialization module can more efficiently build the hierarchy of relationships as higher level parent nodes by comparing parent pixmaps against other parent pixmaps only at those pixel locations that retain an identical color value. These locations are tracked using a two dimensional array of Boolean values referred to as the aggregate mask.

The aggregate mask is of the same dimensions as the pixmaps. The location of an entry within the aggregate mask corresponds directly to the location of the pixel within the pixmap to which the aggregate mask entry refers. Entries in the aggregate mask are set to TRUE in those locations in which corresponding pixels in the pixmap retain identical color values. Conversely, the entries in the aggregate mask are set to FALSE to identify those locations in the pixmap with unique pixel color values for each sub-tree. The nature of this relationship is illustrated in FIG. 5. For example, root node 36 includes a parent pixmap PP36 in which most pixels are displayed using a neutral value (e.g., grayed out), indicating unique pixels for those pixmaps related under each sub-tree. Note that the actual color values of those unique pixels in the root node are irrelevant in practice, and could be any arbitrary value. To define unique pixel locations, entries in aggregate mask A36 of the root node are set to FALSE (e.g., displayed using the color black) in the same locations that the pixmap colors are displayed in gray. However, root node pixmap PP36 does include a single non-neutral pixel in a first column of a second row. This single non-neutral pixel is identical for all lower level nodes, meaning that this single non-neutral pixel is identical for all pixmaps. As will be discussed in further detail below, this single non-neutral pixel could be compared to a similarly located pixel in each cell of the source image. The resulting deviation can be propagated to each node, eliminating the need to repeat multiple comparisons of the same pixel for each pixmap. Note however, that the deviation calculated for a non-neutral pixel of the root node will contribute equally to the deviation totals of all descendent nodes in the tree. Thus, any non-neutral pixel of the root node need not be compared to the source image at all. With relation to the single non-neutral pixel of the root node pixmap, the corresponding entry in the first column of the second row of aggregate mask A36 is set to TRUE (e.g., displayed in white). The entry set to TRUE indicates that the single non-neutral pixel is identical in all pixmaps of nodes descending from the root node. As indicated above, aggregate mask A36 will become the aggregate mask for the entire relationship tree, and the aggregate mask of the root node will be set to a uniform FALSE.

In further detail, at a step 268, the initialization module creates the aggregate mask for the parent node, using a two-step process. First, all aggregate masks of the corresponding child nodes are ANDed together resulting in an initial aggregate mask of the parent node. In the case of a first level parent where the child nodes comprise only leaf nodes, the ANDing operation results in a mask that is set uniformly to TRUE, because the aggregate mask for each leaf node is set uniformly to TRUE. However, for higher level parent nodes with child nodes that comprise intermediate parent nodes, the resulting mask will not be set uniformly to TRUE, because the second step of the process involves a comparison among child nodes that is similar to the comparison described above that was employed to group the nodes. Specifically, the pixels of the child nodes are compared at each corresponding pixel location where the parent node's initial aggregate mask (resulting from the AND operation in the first step above) is set to TRUE. If all n pixels are equal (e.g., in color, intensity, etc.) at a given location in each pixmap of the child nodes, the corresponding element of the parent node's initial aggregate mask is left set to TRUE. Otherwise, the corresponding element is set to FALSE. After processing each location as just described, the initial aggregate mask will become a completely initialized aggregate mask for the parent node. Although all pixels of leaf nodes must be compared to create the aggregate mask for a first level leaf-parent node, the first step of ANDing the aggregate masks of the child nodes reduces the number of comparisons that must be performed to initialize an aggregate mask for higher level parent nodes.

The resulting aggregate mask for the parent node identifies the pixel location(s) in the pixmaps of the child nodes that have the same pixel value. Accordingly, for those pixels that match among children pixmaps, there will be no need to compare every pixel of every child pixmap to a cell of the source image during the processing stage. Once a pixel of one pixmap is compared to a cell element of the source image, the difference (i.e., the deviation) between the pixel of that one pixmap and the corresponding pixel of the source image can be propagated to all other pixmaps that include a matching pixel at the same pixel location. Therefore, fewer comparisons are needed, speeding the entire processing stage.

In summary, TRUE elements of the aggregate mask of any given node, identify those pixel locations in the pixmaps of all nodes descending from the given node in the relationship tree where the pixels match one another. Consequently, the aggregate mask indicates those pixels in the pixmap of the given node for which deviation will be calculated by an ancestor node in the relationship tree and inherited by the given node. Conversely, FALSE elements indicate those pixels for which deviation still must be calculated (either at the given node or at its descendents).

Since the aggregate mask merely identifies the locations at which a node will inherit deviation, the initialization module must still identify which of the remaining locations of the node will require a comparison between a pixmap pixel and an element of the cells in the source image. Any remaining locations of the node that do not need comparison will be left for comparison with descendent nodes. To determine which of the remaining locations of the node will require a comparison, another two dimensional array of Boolean values is created. This two dimensional array is referred to as a coverage mask of the node. The coverage mask is created for a parent node, at a step 270.

Creating a coverage mask also involves a two-step process. Specifically, the initialization module first performs an OR operation between all of the aggregate masks of the corresponding child nodes. The initialization module then performs an exclusive OR (XOR) operation on the resulting temporary mask with the aggregate mask of the parent node that was created at step 268 above. For example, coverage mask C27 of FIG. 5 is created by ORing the aggregate masks of the nodes 16, 21, 10, and 24, then XORing the resulting temporary mask with aggregate mask A27. Where set to TRUE, the coverage mask identifies the locations in the pixmaps of the parent node's children where pixels are to be compared to the source image during the processing stage. Even though the pixel values of interest belong to the pixmaps of the child nodes of the parent, the comparisons of the child pixels of interest to the cells of the source image are performed at the level of the parent. The resulting deviations for each comparison are passed down to the children from the parent. So it is logical to have the coverage mask identifying the locations of those pixels created in the parent. For easy retrieval during the processing stage, the child pixels of interest will also be stored in the parent node, in the form of a composite map, which will be described in detail below.

The aggregate masks and coverage masks essentially provide a way to reduce the number of comparisons with a source image that are needed during the processing stage. For those comparisons that are performed, the processing stage can further be speeded by performing parallel comparisons. To facilitate parallel comparisons, the initialization module creates a composite map of children pixmaps, at a step 272 of FIG. 8. The composite map of a parent node comprises a combination of the pixmaps from the corresponding child nodes. An example composite map CP27 is shown in FIG. 5. The composite map can be implemented as a 3-D array, but is illustrated in FIG. 5 as a 2-D grid of four color values in each of three columns and four horizontal rows, corresponding to the three vertical columns and four horizontal rows of a pixmap.

For color comparisons, the composite map entries are made up of n color values, one composite map entry element for each child node's pixmap pixel color at the corresponding entry location. For black and white comparisons using a single render target, the composite map elements are single color values, with the child nodes' pixmap pixel colors stored per channel within the color value (since the pixmap pixel colors are binary). For instance, if n=4 the first child's pixmap entries are stored in the blue channels of the composite map entries, the second child's in the green channels, the third child's in the red channels, and the fourth child's in the alpha channels. Grouping child pixels in the composite map of the parent makes it possible for the deviation of a source image pixel to be calculated in a single texture rendering pass for all four children of the parent node. For black and white images, grouping child pixels in the composite map of the parent makes it possible to perform a single comparison. Note that for leaf nodes, the composite map is unnecessary and left undefined, because no child nodes are descended from the leaves to use in constructing the composite map and no deviation is calculated at the level of the leaf nodes. Conversely, the leaf nodes could optionally be removed from the relationship tree, since the leaf nodes will not be used for calculating deviations and the pixmap elements of the leaf nodes will be incorporated into the corresponding composite maps and pixmaps of the first level leaf-parent nodes.

As stated above, the coverage mask of a parent node identifies composite map locations containing pixmap values that may be compared to a cell of the source image. In other words, the coverage mask of a parent node identifies the pixels of the corresponding child nodes for which resulting deviations could contribute. However, a TRUE value in the coverage mask does not imply that the corresponding pixels in the pixmaps of all children should be compared to the source image. Instead, a TRUE value only indicates that the pixels in the pixmaps of at least one child need be compared to the source image. This results from the fact that the aggregate masks of the child nodes were initially ORed together in forming the coverage mask of the parent. Even if a specific implementation calls for a comparison operation on all values in a composite map entry (i.e. black and white comparisons), the deviations resulting from the comparisons should only be passed down to the child nodes that will actually be compared to the source image. To eliminate the calculated deviation for those children not needing the calculated deviation or, alternately, to identify those values within the composite map where a comparison is not required in the first place, another mask is required. Thus, at a step 274 of FIG. 8, the initialization module creates a channel mask for the parent node currently under construction. An exemplary channel mask CH27 is illustrated in FIG. 5.

The values of the channel mask are constructed by ANDing the coverage mask of the parent node with the aggregate masks of each of its child nodes and placing the result into a channel corresponding to the child node. During the processing stage, calculated deviation results will be stored in color values, wherein each channel of a color value holds a corresponding deviation result for a child of a node. To restrict the results of a comparison operation to specific child nodes, the deviation results color values will have a channel mask applied to clear calculated deviations from some of the channels before the deviation resulting from the comparison operataion is added to stored deviation totals. Specifically, the channel mask values are set to full intensity in those channels where the corresponding children are to receive the results of a deviation calculation. The intensity is set to zero to mask off those channels where the child nodes are not to receive the results of a deviation calculation. The mask can then be modulated (multiplied) by the results of a comparison to set the deviation to zero for child nodes that will not receive the deviation.

The channel mask is formed as an array having the same dimensions as the coverage mask, with each entry of the array containing one or more color values. The number of color values will depend on the number of simultaneous render targets available. For instance, in an implementation with two simultaneous render targets storing 32-bit colors (e.g., where n=4×2=8), accumulated deviations that will be inherited by the first four children of a parent node are stored in the blue, green, red, and alpha color channels of a first render target for the first, second, third, and fourth child nodes, respectively. The deviations that will be inherited by the last four children of the parent node are stored in the blue, green, red, and alpha color channels of a second render target for the fifth, sixth, seventh, and eighth child nodes, respectively. The channel mask array for this more complex example comprises entries with two color value masks of 32-bit color values. The first color value mask is modulated with the results of deviation calculations for the first four children before the deviation results are added to the first render target. The second color value mask is modulated with the results of deviation calculations for the last four children before the deviation results are added to the second render target.

If black and white comparisons are to be performed during the processing stage, the initialization module may create an additional mask to further optimize the comparisons. This optimization takes advantage of the fact that dedicated 2×2 texel sampling is commonly provided by graphics processing hardware for bilinear interpolation operations in texture filtering. This bilinear-filtered texture sampling involves reading the nearest 2×2 texel group surrounding a given sample point, and calculating a weighted color average based on the distance of texel centers from the sample point. The processing stage can use this filtered sampling technique to accomplish four "simultaneous" reads of pixels from a source image and calculate deviation for all four pixels of a pixmap in a single operation.

In preparation of employing this further optimization for black and white comparisons, the initialization module creates a bilinear mask, at an optional step 276 of FIG. 8. The bilinear mask is preferably formed with a 2-D array of unsigned integers (or any enumerated data type capable of storing three state values). Three values may be assigned to an entry in the bilinear mask. One value indicates that a pixel is outside of a bilinear region. Another value indicates that the pixel is inside a bilinear region. A third value indicates that the pixel is located in the upper left corner of a bilinear region. Initially the bilinear mask is set so that all entries are marked as being outside of a bilinear region. After the entire relationship tree has been fully formed, a separate pass is made to initialize the bilinear masks to their final values. This separate initialization pass corresponds to optional step 232 of FIG. 6.

Like many operations on the relationship tree, this separate initialization pass is performed recursively. A procedure is called on the root node of the relationship tree, which in turn cells the procedure on each of its children. The procedure itself begins by creating and initializing a "break-up" map. This break-up map comprises signed integers and has one less element in each dimension than the dimensions of a pixmap. The procedure then iterates over the pixmaps of the children of a parent node (within the borders of the child nodes), and evaluates every 2×2 pixel region. It will set an entry to zero (0) in the break-up map corresponding to the upper left pixel in the pixel region, if the pixel region forms a bilinear quad. A 2×2 pixel region is considered to be a bilinear quad if the following conditions are met:

The region is contained entirely within the coverage mask of the parent node.

The channel mask entries corresponding to all four pixels in the pixel region are identical (i.e. the output destination is the same for all pixels).

The four pixmap pixels corresponding to the pixel region are of identical color. (Any pixmap from a child node that is a recipient of the channel output may be selected to test for this condition.)

The pixmaps of all child recipients of deviation output from the four pixels (i.e. those children with non-zero channel masks) all match one another in composition.

During the initialization stage, it does not matter if bilinear quads overlap any others. The purpose of initializing the break-up map is only to identify possible quad candidates. If a 2×2 pixel region does not form a bilinear quad, the procedure will set the entry to negative one (−1).

Once the break-up map is initialized, the procedure iterates over the break-up map. If a given entry in the break-up map is set to 0, the eight neighbors surrounding that entry (or less if at an edge) will be examined. For each neighbor not set to −1, the value at the entry will be incremented. When finished, every entry in the break-up map will therefore be set to the number of bilinear quads overlapping at the entry. The break-up map is then iterated nine more times (the maximum number of neighboring quads that a bilinear quad can overlap with is eight). These iterations remove overlapping quads, count the number of quads remaining, and mark the remaining quads in the bilinear mask. For an iteration i (where i begins at 0 and continues while less than 9), each entry encountered in the break-up map with a value of i is counted as remaining. Neighbors of that entry (which themselves will have a greater or equal number of overlaps) are set to −1 in the break-up map. That entry's corresponding value in the bilinear mask is set to being at the upper-left of the quad. Entries to the right, bottom, and bottom-right in the bilinear mask are set to being inside the quad. By completing the nine iterations, all non-overlapping bilinear quads are identified in the bilinear mask, and the number of non-overlapping bilinear quads is totaled. The break-up map is then no longer necessary, so the break-up map is freed, and the procedure is invoked for each child of the current node.

Having initialized the bilinear mask during the initialization stage, the processing stage will be able to use the bilinear mask to identify those pixmap pixels for which the bilinear optimization may be employed. In general, the bilinear mask marks all non-overlapping 2×2 pixel groups that are of the same color, have the same channel masks, and lie within the confines of the coverage mask. To be of the same color, not only must the four pixels in a 2×2 group match one another, but the four pixels must match for all children receiving deviation. In other words, all color values in the composite map for the 2×2 group must be white, or all must be black. Once these 2×2 pixel groups have been identified by the bilinear mask, the 2×2 pixel groups can be processed in a single bilinear texture sampling operation using a bilinear filter, and the deviation for all four pixels can be derived based on the corresponding single bilinear texture sample.

For instance, if the four pixels in a 2×2 pixel group in the pixmap were all black in color, and the weighted image sample from the source image corresponding to those four pixels was 0.5 in all channels, the processing stage could deduce that two of the source image pixels are white and two are black. Just which two are white and which two are black doesn't matter, since all pixmap pixels being compared will be uniform in color. The resulting deviation from the 2×2 pixel group will be the same regardless of which two are white and which two are black. In any case, this optimization further speeds the processing stage for black and white comparisons.

Preparing Nodes For Image Matching

Figure 9:
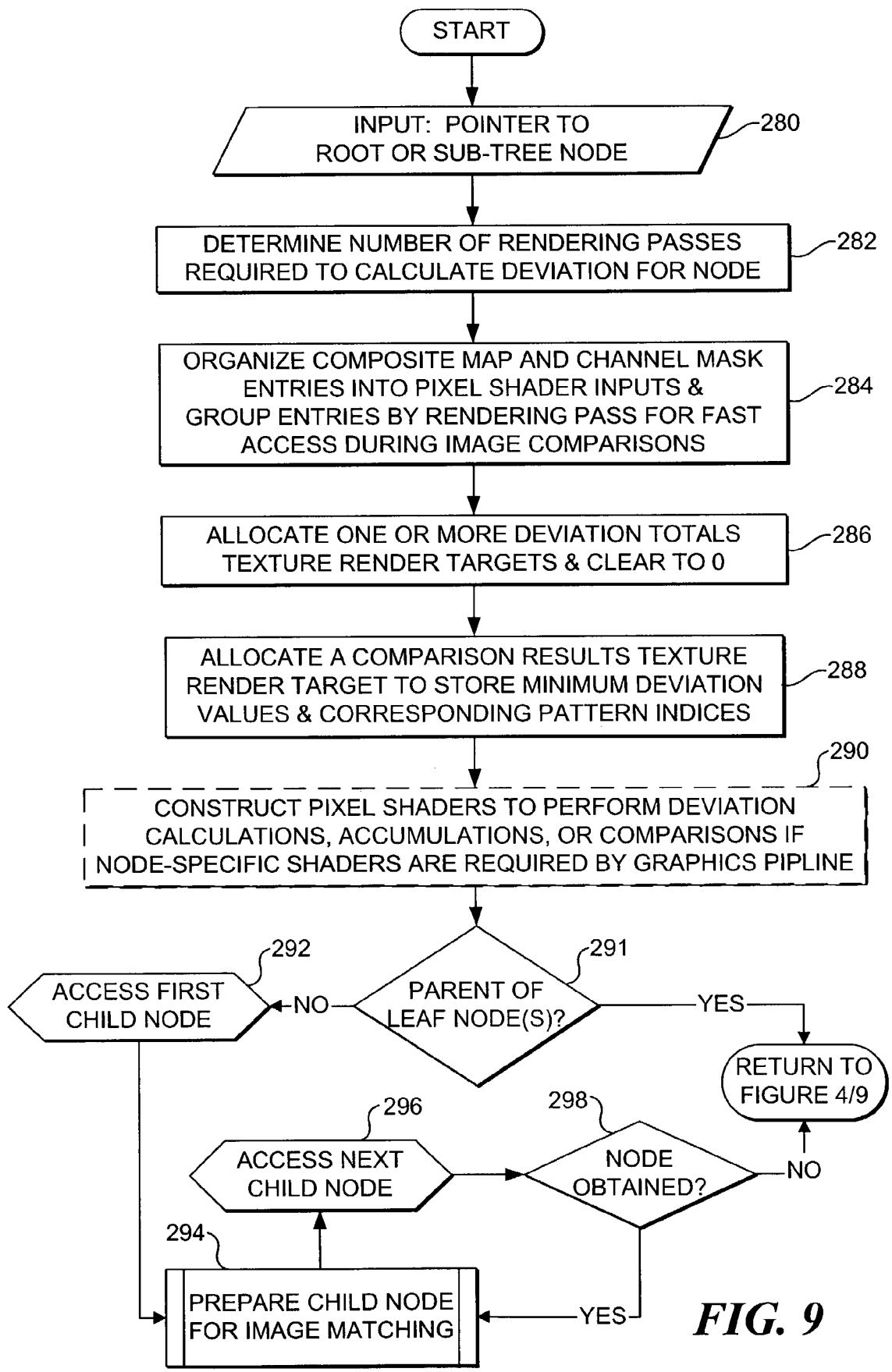
FIG. 9 is a flow diagram illustrating detailed logic for preparing nodes of the relationship tree to match with a source image.

FIG. 9 is a flow diagram illustrating detailed logic for preparing nodes of the relationship tree to match with a source image. FIG. 9 corresponds to step 206 of FIG. 4. Specifically, the initialization module performs a recursive pass over all but the leaf nodes in the relationship tree to perform final set up of the higher level nodes for deviation calculations. Starting with the root node, a pointer 280 directs the initialization module to a node of the relationship tree. Subsequent passes will point to an intermediate level parent node. At a step 282, the initialization module determines the number of rendering passes required to calculate deviation for the current node. The number of rendering passes required will depend on a number of factors, including whether color or black and white comparisons are to be made, the number of color channels available in the render targets to be used, the number of simultaneous render targets available, and the number of bilinear quads available as inputs. Another factor is the programmability of the pixel shaders to be used in the rendering pipeline. Programmability may depend on the number of texture lookups that may be made during the addressing stage, the number of instructions that are available to perform comparisons, whether or not bilinear samples may be performed in some texture lookups while point samples are performed in other texture lookups, and other characteristics of the pixel shader to be used. As indicated above, a full-featured pixel shader will preferably be used, such as that provided in Microsoft Corporation's DIRECTX™ Version 8.0 or later.

At a step 284, the initialization module groups together deviation inputs identified by the coverage mask for each rendering pass. In other words, the initialization module organizes entries of the composite map and the channel mask (as identified by the coverage mask) into pixel shader inputs. The locations of the deviation inputs in the current node are also stored for easy access during the rendering stage.

At a step 286, the initialization module allocates one or more off-screen render targets, which will be used to hold deviation totals. These render targets will be referred to as deviation totals textures. Each texel in a deviation totals texture will hold a sum of deviations calculated between the composite map pixels identified by the coverage mask of the node and the cells of the source image. The size of the texture can be defined by the following expression:

Deviation totals texture width=(Source image width+Pixmap width−1)/Pixmap width

Deviation totals texture height=(Source image height+Pixmap height−1)/Pixmap height Once allocated, the initialization module initializes these deviation totals textures to zero (0).

At a step 288, the initialization module allocates an off-screen render target which will be used to hold the results of comparing deviation totals to one another. This render target shall be referred to as a comparison results texture. The comparison results texture will store minimum deviation values and corresponding pixmap indices into the original pattern lexicon. During a rendering pass of the processing stage, deviation comparisons are made by sampling from deviation totals textures and determining the minimum values. The minimum values, along with the indices of the pixmaps that yielded them, are written out to the comparison results texture. After all deviation totals comparisons have been made (through the comparison of deviation totals textures and then comparison results textures), a single comparison results texture will remain. This remaining comparison results texture will contain the final minimum deviation and pixmap indices corresponding to each cell in the source image.

At an optional step 290, the initialization module creates any per-node pixel shaders, if per-node pixel shaders are required by the graphics pipeline. These per-node pixel shaders will contain the actual instructions to perform pixel comparisons, deviation comparisons, or deviation accumulations.

Having completed the above preparations for a node, the initialization module recursively walks down the relationship tree to prepare child nodes that are not leaf nodes. Thus, at a decision step 291, the initialization module determines whether the node is the parent of leaf nodes. If the node is a parent of leaves, control returns to the previous instantiation in the preparation process, until all nodes have been prepared. If the node is not a parent of leaf nodes, the initialization module accesses a first child node of the previously prepared node, at a step 292. The initialization module then invokes another instantiation of the above preparation process, at a step 294, to prepare the child node. When the child node (and all non-leaf descendent nodes in the child's sub-tree) has been prepared, the initialization module then accesses the next child node, at a step 296. If a next child is available, as determined at a decision step 298, the next child node is prepared, at step 298. All corresponding children of the node are prepared in this way. When the last child of the node has been prepared, control returns to the previous instantiation in the preparation process, until all intermediate nodes have been prepared. Control then returns to the overall initialization process of FIG. 4 to create generalized pixel shaders and to create textures as discussed above.

Processing Stage

After completion of the above initialization stage, the processing stage may begin when a source image becomes available. In the exemplary preferred embodiment, a graphics pipeline executes a processing module in a rapidly repeated fashion for realtime comparisons of source image frames to the pixmaps comprising a preferred pattern lexicon. The processing module performs the same operations for each successive frame of the source image. Accordingly, the following discussion explains the processing of only a single source image frame.

In general, the processing module compares each necessary pixmap pixel to each cell in the source image. More specifically, the processing module determines any difference in the red, green, and blue (RGB) colors for each pixel in a pixmap relative to a corresponding pixel in a cell of the source image. This comparison thus determines a deviation between the pixmap and the cell. After all necessary pixmaps pixels have been compared to corresponding pixels of all cells, the pixmap having the least deviation is selected to represent each cell. The invention performs this process more efficiently than prior art processes because it can perform the comparisons of a pixmap to all cells in the source image in parallel, and by using the relationship tree to eliminate redundant deviation calculations for pixels common to multiple pixmaps. More specifically, the relationship tree of pixmaps defines the following common regions. Every node in the relationship tree defines pixels that are identical for all leaf pixmaps in that node's sub-tree. Because of this relationship, it is possible to calculate deviation in these common pixels for all pixmaps in the sub-tree simultaneously. Two pixels of the same color from different pixmaps in the set need not be compared to the same pixel in the source image more than once for a given source image frame. The first pixel is compared and the second simply inherits the deviation determined by the comparison.

Figure 10:
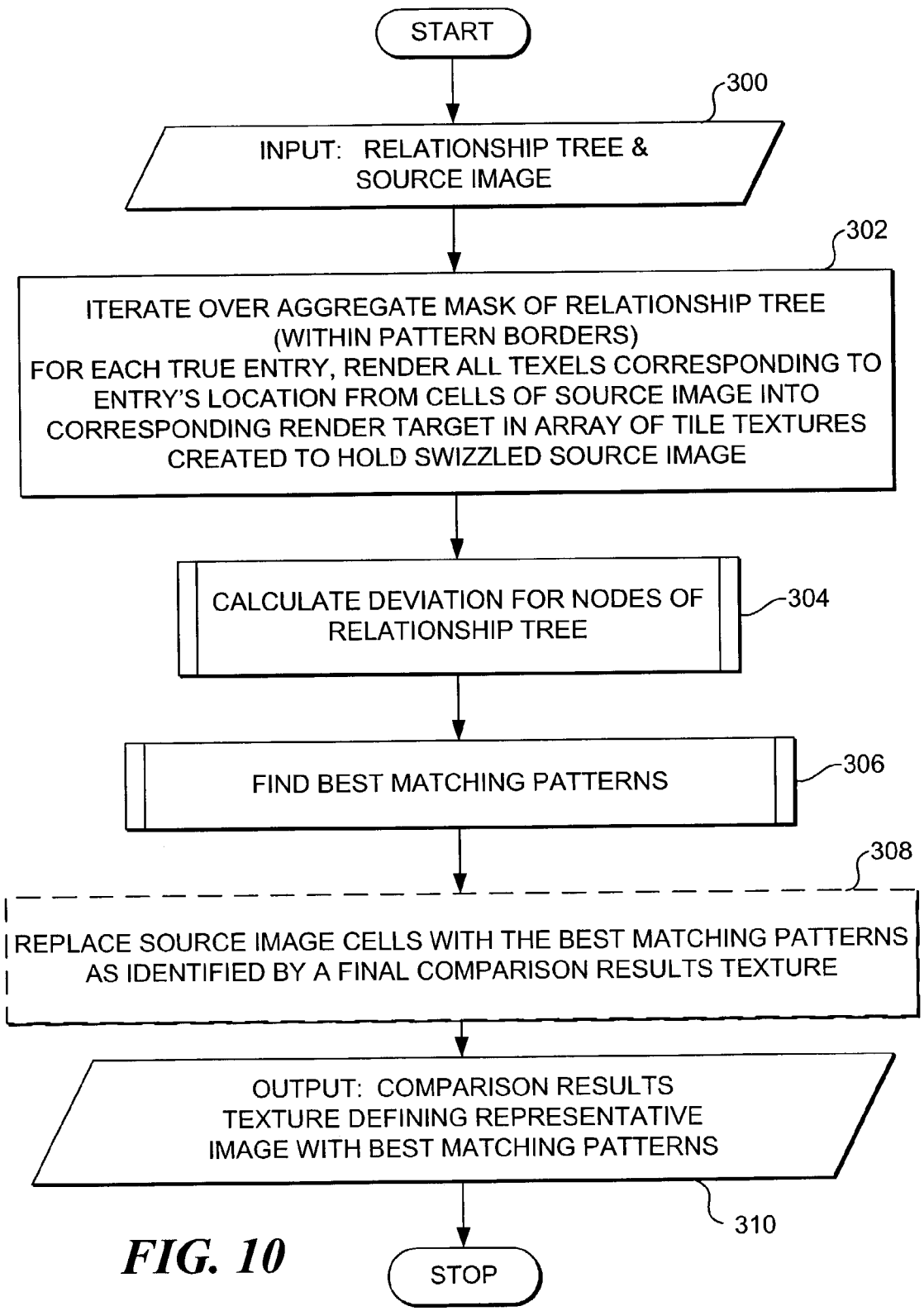
FIG. 10 is a flow diagram illustrating overall logic of the processing stage.

FIG. 10 is a flow diagram illustrating the overall logic of the processing stage. The relationship tree and a source image are provided as input 300. At a step 302, the processing module begins a swizzling operation by rearranging the pixels of the source image in such a way as to group together those pixels in equivalent relative locations for each cell of the source image. For example, all pixels located at the coordinates <4, 5> of each cell will be grouped with one another. The grouped pixels will be stored in the array of tile textures that was created at the end of the initialization process in the first stage (i.e., at step 210 of FIG. 4). Here the pixmaps can be thought of as superimposed upon the cells of the source image, and only those pixels that fall outside the aggregate mask of the relationship tree need be rearranged (since only those need be considered in calculating the deviation). For instance, assume that the relationship tree's overall aggregate mask is set to TRUE, FALSE, TRUE at the first three entries of the first row (within the border region). In this case, the first tile texture in the array will contain all pixels located at the upper left border of each cell in the source image. The second tile texture was never created and is passed over, because its corresponding aggregate mask element is set to FALSE. The third tile texture will contain all pixels located two pixels to the right of the upper left border of each cell. The purpose of this swizzling of pixels is to improve cache coherency of the pixels during texture sampling. Since deviation rendering passes are performed on the same specific locations across all cells in the source image, locating those pixels near one another in memory reduces cache misses and increases the speed of comparisons.

At a step 304, the processing module calculates deviation for each node in the relationship tree and accumulates deviation for the relationship tree descended from the root node. Calculation and accumulation of deviation preferably starts at the root node by comparing all pixels common to all pixmaps in the set. That deviation is propagated to all children. In a recursive manner, all common pixels in the children are compared to determine a next level of deviation. This next level of deviation is added to the deviation propagated from the root, producing a sum. That sum is then passed to all children. The process is repeated down the relationship tree until all leaf nodes have the total deviation for their respective pixmaps. The description set forth below focuses on how deviation is calculated for a single node, including sources of input, pixel shader code to perform the calculations, and an explanation of how output is directed. The process detailed in the description is applied recursively in the same manner to all nodes in the relationship tree. Further details regarding calculating and accumulating deviation are provided below with regard to FIGS. 11–14.

At the end of the recursive process of calculating deviation down the relationship tree, the parent nodes of the leaves of the relationship tree will contain final deviation results for all leaves stored in color channels of corresponding deviation totals textures. Each texel in one of these textures corresponds to a cell in the source image and contains deviation sums in each of its color channels which indicate how much the corresponding leaf node pixmaps differ from the source image cell. It then remains to compare all of these deviation totals, both between the totals stored within the deviation totals color channels of each individual leaf-parent node, and between the different leaf-parent nodes. The comparisons are done at a step 306, finding the smallest pixmap deviation total at every pixel location of a deviation totals texture (which relates to every cell location in the source image).

The above steps for accumulating all deviation down to leaf-parent nodes and then comparing the final deviation totals is straightforward, but it requires the complete summation of all deviation calculated by the nodes in the relationship tree. However, an alternative approach is also possible. This alternative approach is a hybrid approach which actually performs comparisons of intermediate deviation totals within nodes before accumulating deviation totals between nodes. Deviation is accumulated only where needed during the comparison stage. With this alternative approach, deviation is not propagated from the root node on down the tree in the direction of the leaves, but instead, is propagated up the relationship tree from the first level parent nodes of the leaves (i.e., the leaf-parent nodes) to the root node. Further, this upward propagation flows to any given parent from all of its children in a single pass. However, this upward propagation includes only those deviation components relevant to further deviation comparisons, because an interleaved comparison step is performed prior to further upward propagation. This interleaved comparison step significantly reduces the number of deviation accumulation rendering passes between nodes. However, this reduction comes at the expense of increased data output from the comparison operations, and a possible increase in the number of comparisons required. Nevertheless, both approaches will be described in further detail below. The approach that should be used depends on the graphics pipeline being employed.

With either approach, once all comparisons have been made, a final comparison results texture will hold the minimum deviation values across all nodes in the relationship tree. Each pixel (or texel) in this comparison results texture corresponds to one cell in the source image. The minimum deviation value stored in a first color channel of each pixel indicates how much the corresponding pixmaps deviate from each cell of the source image. A pixmap index is stored in a second color channel of each pixel, such that the pixmap index identifies the pixmap that was matched to the pixels of a cell in the source image to produce the minimum deviation value stored in the first color channel of the pixel. In this way, the best matching pixmap for each cell in the source image is determined.

At this point, all that remains, if desired, is to replace the cells in the original source image with the matching pixmaps from the set. At an optional step 308, the processing module can replace cells from the source image with the best matching pixmaps from the relationship tree, as identified by the final comparison results texture. This step is optional, as the final comparison results texture already indicates the best matching pixmaps for each cell in the source image, but the source image can be overwritten depending on the application. For this case, the processing module preferably renders a grid of vertex quads that are aligned with the cells of the source image onto the image, using the pixmaps as a texture input and mapping the correct pixmaps through coordinate offsets. For example, the processing module may recast the comparison results texture as a vertex stream source and may correspondingly use the pixmap indices stored in the second channel to form texture coordinate offset values (or indices into a table of texture coordinate offsets). These texture coordinate offsets then reference a texture containing all pixmaps from the pattern set. The processing module can render a grid of vertex quads aligned with the cell regions of the source onto the source image, using the pixmap texture as input and mapping the correct pixmaps through the coordinate offsets.

Finally, a single comparison results texture 310 is produced that indicates the best matching pixmaps from the pattern set across all cells in the source image. Although the implementation takes many steps to arrive at the result, the actual execution of these steps is very fast in practice. The processing module then evaluates the next frame of video as soon as it is available, repeating the comparison process again.

Calculating Deviation for the Relationship Tree

Figure 11:
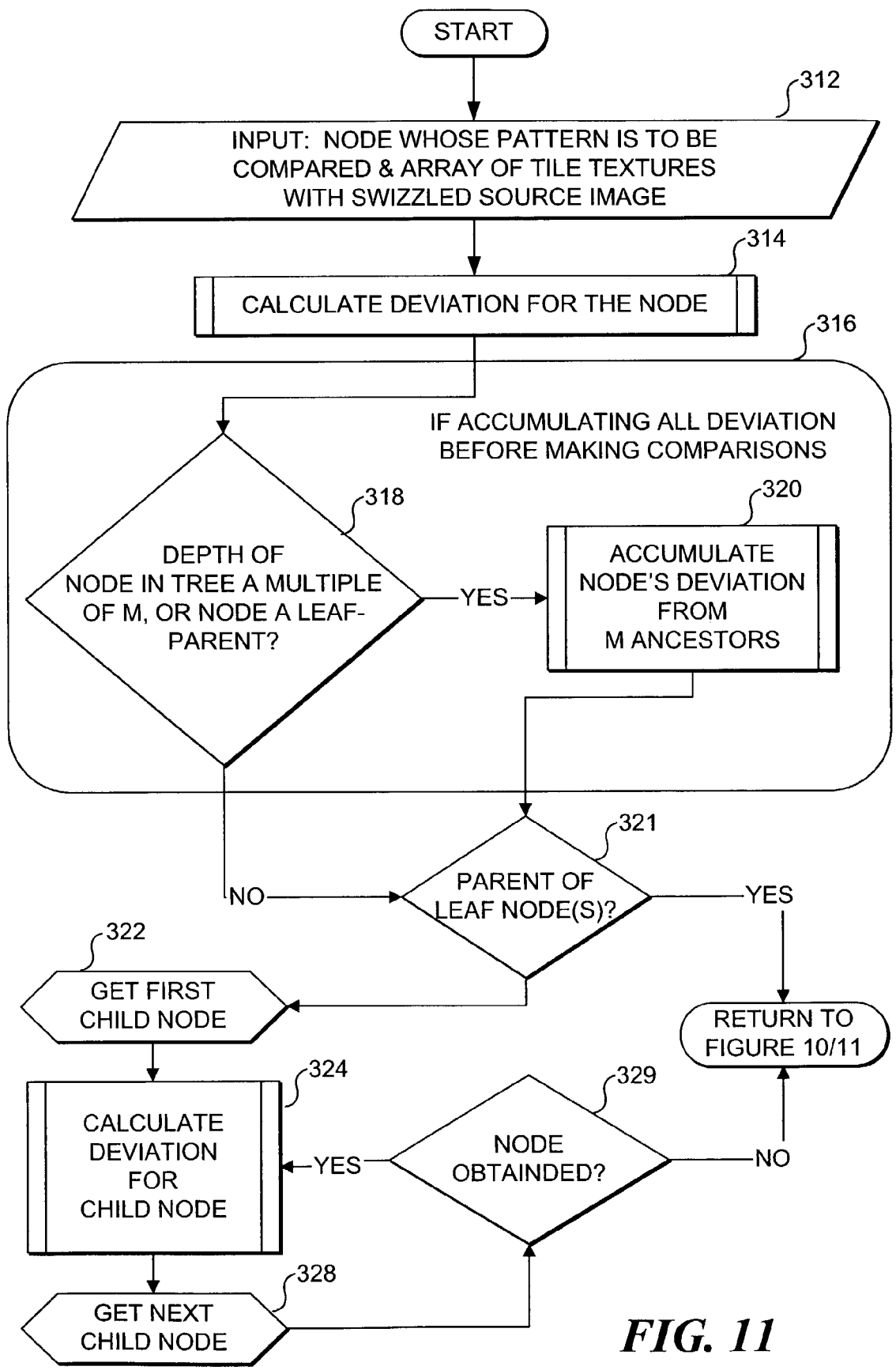
FIG. 11 is a flow diagram illustrating logic for calculating deviation for any sub-tree of a current node.

Additional detail is now provided for calculating deviation, as introduced at step 304 of FIG. 10. FIG. 11 is a flow diagram illustrating logic for calculating deviation for any sub-tree of a current node (e.g., the root node or any parent node). As indicated above, the processing module preferably recursively calculates deviation for each sub-tree of the relationship tree from the root node down to leaf-parent nodes. Deviation calculation input 312 comprises a current node, whose pixmap is to be compared with cells, and the array of tile textures containing the swizzled pixels of the source image. At a step 314, the processing module calculates deviation for the current node itself. Details regarding calculating deviation for a single node are described below with regard to FIG. 12.

Once the deviation for the current node itself is calculated, the processing module preferably accumulates deviation from ancestor nodes at a step 316. In this step, deviation from previous nodes is preferably passed down and added to the deviation calculated for the current node. As a result of this recursive process, a complete summation of all calculated deviation is held exclusively at the first level parent nodes of the leaf nodes. Comparisons of these total deviations can then proceed as a separate step to identify the smallest deviation (i.e., step 306 of FIG. 10). Recall, however, that the alternative approach interleaves the steps of accumulating deviations and comparing the deviations to the source image cells.

With the first approach that accumulates all of the deviation before making comparisons, the processing module must periodically accumulate deviation from several generations of nodes. Ideally, the accumulation could simply be performed only once, at the immediate parents of the leaf nodes. For each leaf-parent node, the processing module would add together the deviation results stored in the applicable channel of each ancestor node's deviation totals texture. This is done because only one color channel of each deviation totals texture will hold deviation results for any given child node. However, the deviation totals are added together by rendering deviation totals textures of the parent nodes into a deviation totals texture of the child. Thus, the process is limited by the number of texture fetches supported by the pixel shader available for the graphics pipeline employed. Therefore, the accumulation is preferably performed only at certain levels of depth in processing the relationship tree. Specifically, the deviation is accumulated only at integer multiples of the number m of texture fetches supported by the pixel shader available for the graphics pipeline For the current generation of graphics pipelines, the number m of texture fetches is typically equal to 4. For example, assuming the root node is at a depth of 0, deviation must be accumulated at depths of m, 2×m, 3×m, 4×m, and so on, until a final accumulation is reached at a depth that is one level higher than that of the leaf nodes. Accordingly, at a decision step 318, the processing module determines whether the depth of the current node is a multiple of m or is at the depth of the immediate parents of the leaf nodes.

One might expect the deviation flow to carry on down to the leaf nodes themselves. However, the deviation at any given node is calculated using the composite map entries of the node. Since the composite map is itself a combination of the pixmaps of the child nodes, and the deviation results for all children are encoded into the various color channels in the parent node, the deviation results calculated in the parent nodes of the leaf nodes are final. The leaf nodes have nothing further to contribute and simply inherit the deviation stored in the parent nodes.

If the depth of the current node is a multiple of m or is the depth of the immediate parents of the leaf nodes, the processing module accumulates deviation for the current node from m ancestors, at a step 320. Further detail of the accumulation process is discussed below with regard to FIG. 14. Once the deviation has been accumulated, or if the current node is at an appropriate depth, the processing module begins walking down the sub-tree of the current node. The processing module first determines whether the current node is a parent of leaf nodes, at a decision step 321. If the current node is a parent of leaf nodes, control returns to the previous instantiation of the sub-tree deviation calculation process. If the current node is not a parent of leaf nodes, the processing module accesses the first child node, at a step 322. The processing module then invokes another instantiation of the above sub-tree deviation calculation process, at a step 324, to calculate deviation for the sub-tree of the child node. This recursive process walks down a path of the relationship tree until a leaf node is encountered. When deviation has been calculated for the sub-tree of the child node, the processing module attempts to access a next child node of the current node, at a step 328. If a next child node is obtained, as determined at a decision step 329, deviation is calculated for the next child node sub-tree, at step 324. The processing module calculates deviation for the sub-trees of all corresponding child nodes in this manner. When deviation for the last child of the current node has been calculated, control returns to the previous instantiation of the sub-tree deviation calculation process, until all deviation has been calculated for the tree. Control then returns to the overall processing stage of FIG. 10 to find best matching pixmaps.

Calculate Deviation for a Single Node

Figure 12:
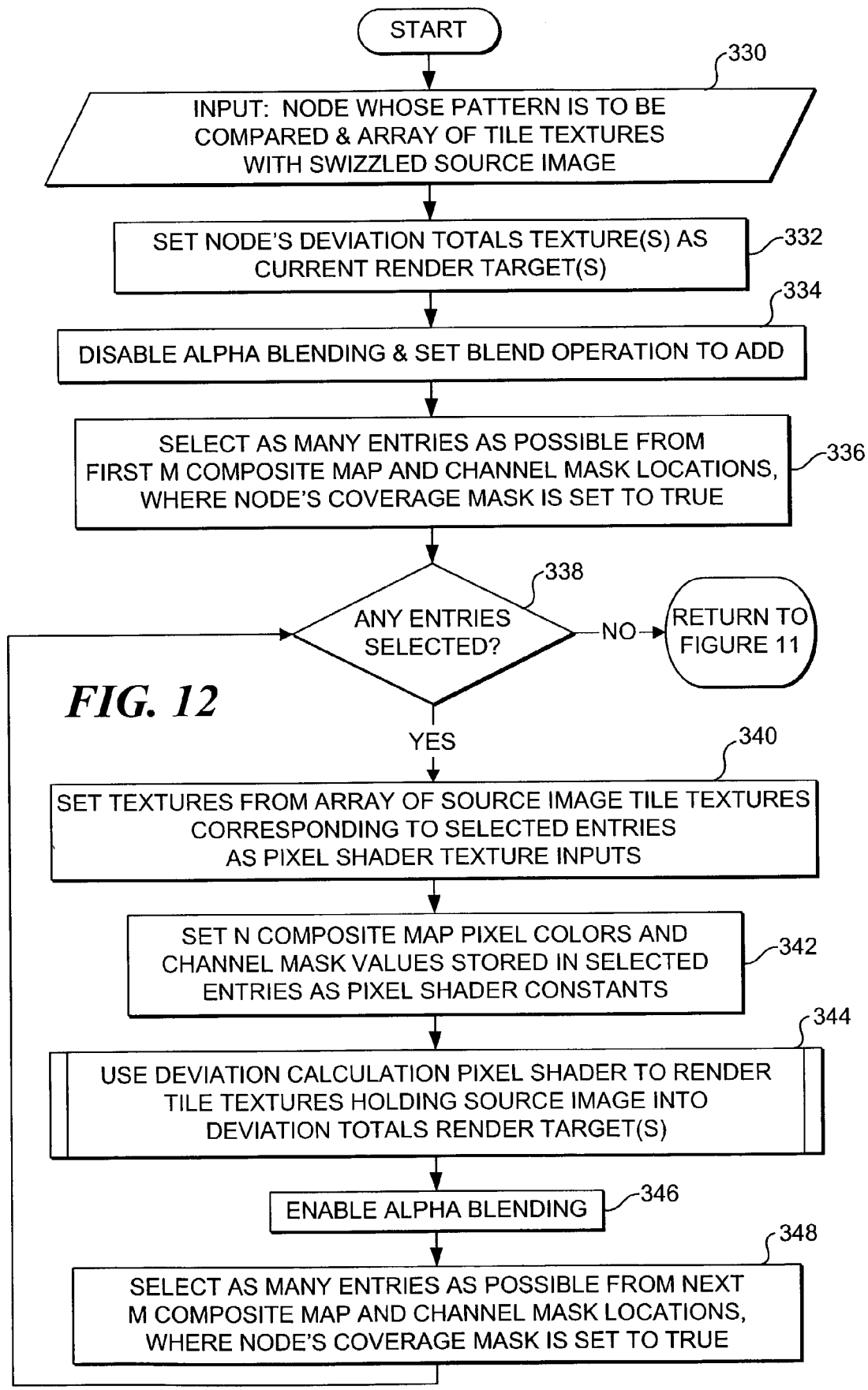
FIG. 12 is a flow diagram illustrating logic for calculating deviation for a single node.

Additional detail is now provided for calculating the deviation of an individual node, as introduced at step 314 of FIG. 11. FIG. 12 is a flow diagram illustrating the logic for calculating deviation for a single node. Deviation calculation input 330 is input from the above process of FIG. 11, for calculating deviation of an entire sub-tree of the current node. Specifically, deviation calculation input 330 comprises the current node, including the node's aggregate mask, coverage mask, composite map, and channel mask, (and bilinear mask if only black and white pixmaps are used). Deviation calculation input 330 also includes the array of tile textures containing the swizzled pixels of the source image.

The deviation calculation for a node in the tree begins at a step 332 by setting deviation totals texture(s) for the node as the current render target(s). For the first pass, alpha blending is disabled, at a step 334. Disabling alpha blending will clear the deviation totals for the node, because the node may still contain totals from the previous frame's calculations. The blend operation is also set to add, so that when alpha blending is later enabled, the processing module can add together the deviations of individual pixels compared in each pass and arrive at the total deviation for all pixels identified by the coverage mask for the node. By using alpha blending in this manner, deviations of the set calculated by the rendering passes for the composite map pixels identified by the coverage mask are summed together to provide the total deviation for all unique pixels of each child node.

At a step 336, the processing module selects as many entries as possible from the first m locations of the node's composite map and channel mask, where the coverage mask of the node is set to TRUE. Each of the m locations corresponds to a group of pixels. Note that for black and white deviation calculations, locations marked as "inside" the bilinear mask are not counted as individual entries. Instead, theses locations are considered the same entry as the "upper-left" location.

At a decision step 338, the processing module determines whether any entries were available and selected. If entries were selected, the processing module then iterates over selected locations in the node's composite map and channel mask, as identified by the node's coverage mask (i.e., all selected pixel groups). The iteration occurs at a rate of m groups per rendering pass. This iteration process begins at a step 340, with the processing module setting the corresponding m tile textures containing the swizzled pixels of the source image as pixel shader texture inputs. This pixel shader will be referred to as a deviation calculation pixel shader to distinguish from other pixel shaders used later.

The processing module sets n pixels each from the m locations in the composite map and r channel mask values from m locations in the channel mask array as deviation calculation pixel shader constants, at a step 342. The colors stored in the composite map are made available to the deviation calculation pixel shader by setting them in constant registers, since these colors will be invariant across every cell in the source image. Likewise, the channel mask entries corresponding to the colors will also be constant for all cells.

The processing module then uses the deviation calculation pixel shader to render the corresponding m tile textures containing the swizzled pixels of the source image into the deviation totals texture(s) set as render target(s), at a step 344. The deviation calculation pixel shader uses a screen-space quad with the dimensions of the tile textures and deviation totals texture(s). More specifically, the deviation calculation pixel shader samples the m tile textures for each rendering pass. Each sampled texel of the tile textures is compared to a number of the n composite colors of the node's composite map, as a function of those identified by the node's channel mask as affecting the deviation output. Note that for black and white comparisons where multiple composite colors are encoded together in channels, the comparison must be done for all of these composites, but the channel mask will constrain the output to only the relevant channels. For color comparisons, the deviations calculated from the comparisons against a single texel are arranged into corresponding output channels. For black and white comparisons, the deviations calculated from the comparisons are already formed into channels, but are then modulated by the node's channel mask. The encoded deviation outputs from each of the m texel comparisons are then added together and output into the corresponding deviation totals texture(s) set as render target(s). Further detail regarding the deviation calculation pixel shader is provided below with regard to FIG. 13.

Thereafter, alpha blending is enabled, at a step 346 of FIG. 12, with the blend operation set to add. As indicated above, enabling blending enables the deviations of individual pixels compared in each pass to be added together, to arrive at a total for all pixels in the coverage mask for the node. At a step 336, the processing module selects as many entries as possible from the next m locations of the node's composite map and channel mask, where the coverage mask of the node is set to TRUE. Control then returns to decision step 338 where, if any entries were selected, deviation is calculated for the selected entries, at step 340, by comparing the next group of source image pixels (i.e., the next group of tile texture texels) against the next group of composite map pixels for the node (i.e., the next group of pixels from the pixmap(s) of the current node's children). When all entries of the composite map have been compared to their corresponding entries in the array of tile textures, control returns to the logic of FIG. 11 to accumulate the calculated deviation with that of ancestors of the current node.

Pixel Shader for Color Comparisons to Calculate Deviation

Figure 13:
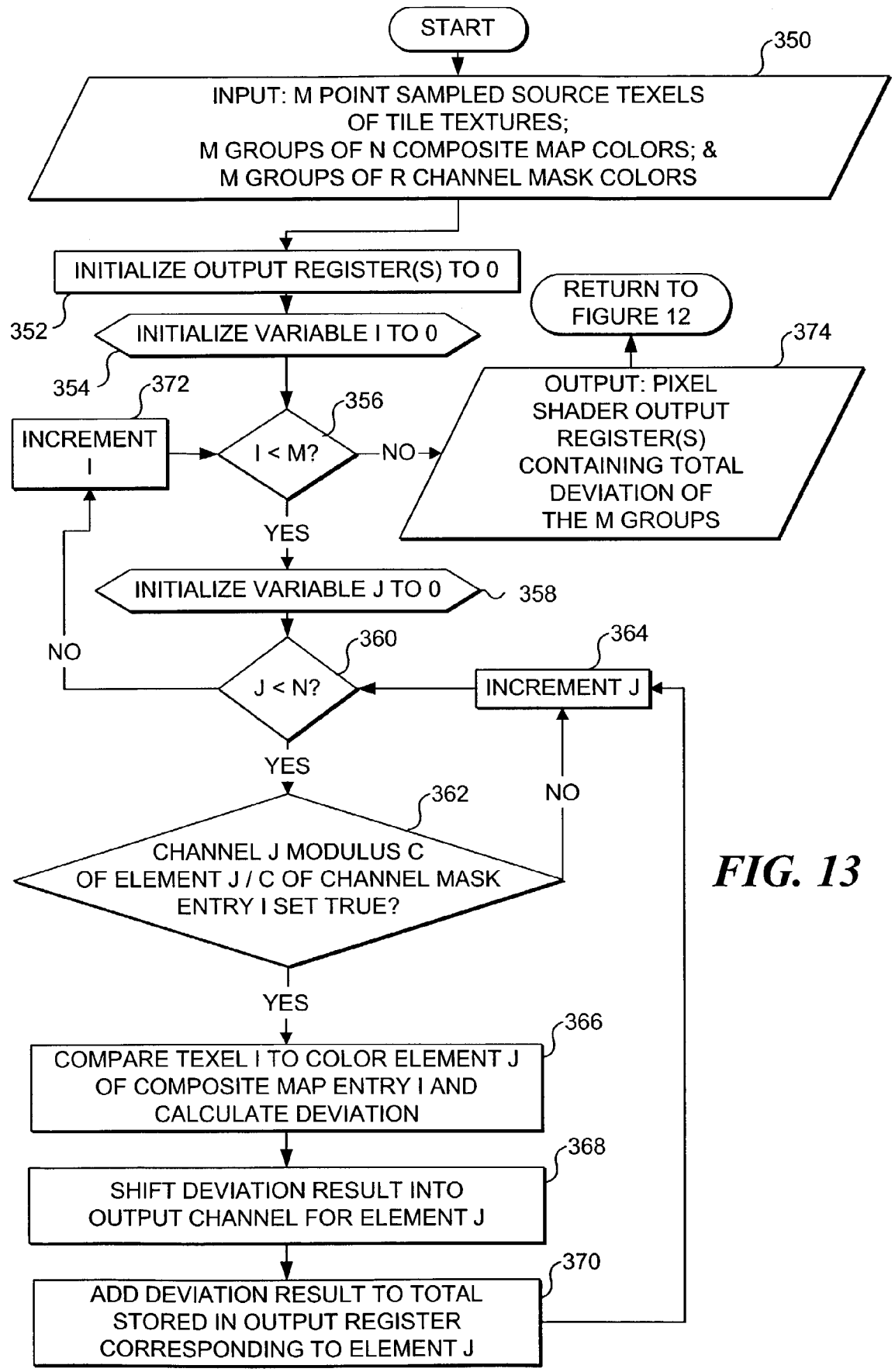
FIG. 13 is a flow diagram illustrating logic for a deviation calculation pixel shader used to compare tile texture texels (i.e., swizzled pixels of the source image) against a node's composite map (i.e., the pixels of a node's composite sub-set of pixmaps)

To help clarify the process of comparing source image pixels against pixmaps of the given pattern set, additional detail is provided for an exemplary deviation calculation pixel shader, to calculate deviation, as introduced at step 344 of FIG. 12. FIG. 13 is a flow diagram illustrating the logic for a deviation calculation pixel shader to compare tile texture texels (i.e., the swizzled pixels of the source image) against a node's composite map (i.e., the pixels of a node's composite sub-set of child pixmaps). The comparison results in a difference that is the calculated deviation between the tile texture texels and the pixels of node's composite map.

A number of factors affect the formation of a rendering pass to calculate deviation by any pixel shader. One factor is the number and precision of color output channels in one or more destination render targets. Another factor is the number of different textures that can be sampled during texture addressing in the pixel shader. Another factor is the supported number of instructions in the shader. Yet another factor is the number of constant registers available. A further factor is the nature of the pixel comparisons (i.e., whether the comparisons are for black and white, or color images). For black and white comparisons, another factor is the number of bilinear quads being sampled.

By definition, the graphics pipeline supports n total output channels for all simultaneous render targets (which are deviation totals textures at this point in the process), with sufficient precision to properly differentiate between the deviation results of all pixmap-to-source-image comparisons. In this case, n elements are present at each location in the composite map of the node. For color pixmaps, this will result in up to n comparisons for each pixel sampled from the source image during a rendering pass. For black and white pixmaps, where the composite map has been merged into a single color value, the number of comparisons equals the supported number of deviation totals textures set as render targets (i.e., equals r).

As suggested above, the number of texture fetches in the pixel shader determines the number of composite map entries of the node that are compared in a pass. These composite map entries are identified by the coverage mask for the node. Accordingly, if m texture fetches are supported by the pixel shader, the processing module chooses m different groups of n pixels from the composite map that are identified by m different entries in the coverage mask. The processing module sets these chosen pixel groups in pixel shader constants. The pixel shader compares these pixel groups to m textures from the array of tile textures containing the swizzled pixels of the source image. The results of the comparisons are later added together (i.e., accumulated).

Thus, deviation calculation pixel shader input 350 comprises m source texels from the tile textures (i.e., from the swizzled version of the source image), m groups of n composite map colors, and m groups of r channel masks. Recall that r is the number of simultaneous render targets supported. At a step 352, the deviation calculation pixel shader initializes output register(s) to zero (0). At a step 354, the deviation calculation pixel shader also initializes a counter variable i to 0. At a decision step 356, the deviation calculation pixel shader determines whether the counter variable i is less than m. If the counter variable i is less than m, the deviation calculation pixel shader initializes a sub-counter variable j to 0, at a step 358. At a decision step 360, the deviation calculation pixel shader determines whether the sub-counter variable j is less than n. If the sub-counter variable j is less than n, the deviation calculation pixel shader determines, at a decision step 362, whether a channel j modulus c of an element j/c of channel mask entry i is set to TRUE. Recall that c is the number of channels present in the color of a render target pixel. If the channel is set to FALSE, the deviation calculation pixel shader increments sub-counter j, at a step 364. However, if the channel is set to TRUE, the deviation calculation pixel shader performs a comparison, at a step 366, between a texel m of the current tile texture and a color element j of composite map entry i to determine a deviation between the swizzled source image texel and the composite map entry.

The deviation calculation itself is the same for all comparisons, but the exact nature of the calculation depends in large part upon the application of the invention. The calculation also depends in part upon the instructions available in the pixel shader, and in part upon the precision of the output color channels. For color images, deviation might be calculated by treating each color as a 3-D vector in RGB color space, subtracting the two vectors, calculating the magnitude (or square of the magnitude) of the resulting vector, dividing by the maximum magnitude possible, and multiplying by a maximum pixel deviation constant based on the output channel precision. For black and white images, a simple XOR operation might be applied to the pixels and the result output as the deviation. Additional operations can also factor into the deviation calculation, if the particular application warrants them. For example, entries from the composite mask being compared to texels of swizzled source image might first be transformed in such a way as to scale the color channels according to their relative importance in human visual perception (e.g., multiplying the RGB color vectors by <0.299, 0.587, 0.114>) before the comparison to find the best matches perceived by a human being.

In any case, once the deviation is calculated, the deviation calculation pixel shader shifts the deviation result into a corresponding output channel for color element j, at a step 368. At a step 370, the deviation calculation pixel shader adds the deviation result to a total stored in an output register corresponding to color element j. The deviation calculation pixel shader then increments sub-counter j at step 364. Control then returns to decision step 360 to determine whether any more color elements of composite map entry i can be compared to the same texel of the swizzled source image (i.e., of the tile texture). When all of the color elements of a given composite map entry have been compared to a texel m, the deviation calculation pixel shader increments counter i, at a step 372. Control then returns to decision step 356, to determine whether a deviation has been calculated for all composite map groups. When deviation has been calculated for all composite map groups, the deviation calculation pixel shader returns an output 374 to the processing module for continued processing according to FIG. 12. Output 374 comprises register(s) containing total deviation(s) of the m groups.

In general, the results of the comparisons are merged into the color channels of the pixel shader outputs and sent to the deviation totals textures currently set as render targets for a node. As has been shown, for color comparisons the channel masks were used to limit the comparisons of the composite map entries. Only those entries in the composite map that were identified as contributing to the output were actually compared. So the results of the comparisons never included non-contributing composite map entries. In the case of black and white comparisons, however, no comparisons are skipped. So the channel masks must be applied to the deviation results after the deviation results have been encoded into color channels for output, but before the deviation results are added to deviation totals stored in the output register(s) of the pixel shader.

Also, recall that black and white comparisons utilize bilinear texture filtering. In this case, if m texture fetches are supported, and m bilinear groupings are available in a pass for a node (as identified by the bilinear mask), then 4×m pixel groups may be chosen from the composite map (where they are also set in the bilinear mask). The entries from one pixel group are set in pixel shader constants (only one group of entries need be set, since the entries all match between the groups in the bilinear region). For these pixel groups, the deviation is calculated for all 4 pixel groups through the single bilinear-filtered texture sample. The precise deviation is derived based on the intensity of the sampling in the manner described in the initialization stage with regard to the bilinear mask.

Accumulate Deviation for a Node from m Ancestors

Figure 14:
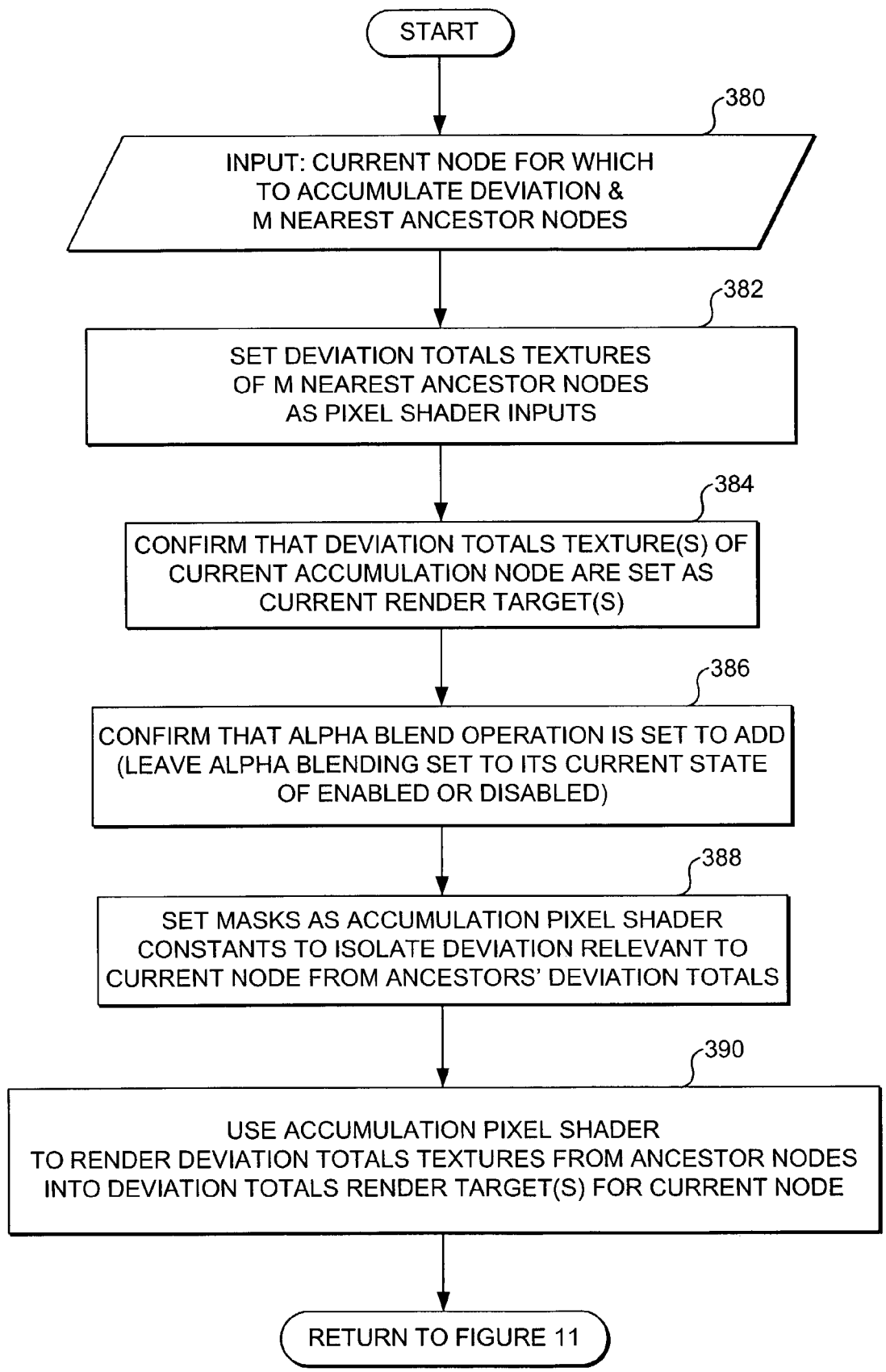
FIG. 14 is a flow diagram illustrating logic for accumulating deviation for a node from a number of ancestors.

Additional details are now provided for accumulating deviation for an individual node, as introduced at step 320 of FIG. 11. FIG. 14 is a flow diagram illustrating the logic for accumulating deviation for a node from m ancestors. More specifically, this process accumulates deviation from ancestor nodes into a current accumulation node 380, at a depth with a multiple of m (or at the depth of a leaf-parent node). To begin, at a step 382, the processing module sets deviation totals textures of the m nearest ancestors as inputs in an accumulation pixel shader. The accumulation pixel shader accumulates deviation from a number of ancestor nodes for a current accumulation node. This accumulation pixel shader is different than the deviation calculation pixel shader described above that simply calculates the deviation for a node, independent of ancestor nodes. Deviation totals textures of fewer than m ancestor nodes may be used, if current accumulation node 380 is an immediate parent of a leaf node. If multiple render targets are being used, only the deviation totals texture of an ancestor node that is relevant to the sub-tree containing accumulation node 380 is set as an accumulation pixel shader texture input. The other deviation totals textures in the ancestor node can be ignored.

At a step 384, the processing module may confirm that the current destination render target(s) remain set as the deviation totals texture(s) that were set for current accumulation node 380 during the just-completed individual deviation calculations of current accumulation node 380. Similarly, the processing module may confirm, at a step 386, that the alpha blending operation remains set to add in its current state of enablement. If any deviation was calculated for current accumulation node 380, alpha blending will be in an enabled state. Otherwise, alpha blending will be disabled, so that deviation results that were calculated for a previous frame will be cleared.

At a step 388, the processing module isolates relevant deviation totals from the corresponding ancestor nodes by setting accumulation pixel shader constants that will mask out irrelevant deviation totals from the corresponding ancestor nodes. The positioning of the current accumulation node in the relationship tree is used to isolate a channel for a particular ancestor node. Thus, isolation will depend on the branch of the ancestor node that forms the sub-tree containing the current accumulation node inheriting the deviation. For example, when inheriting deviation from a grandparent node, the color value mask used to isolate the proper channel holding the grandparent node's relevant deviation will depend on whether the current accumulation node's parent node is the first child, second child, third child, etc., of the grandparent node. If the parent node is the grandparent's first child, the blue channel will be the channel that is masked off to obtain the proper deviation for the current accumulation node. Likewise, the channel mask used on the parent node will depend upon the relationship of the inheriting child node. If the inheriting child node is the parent's third child, the red channel of the parent's deviation will be isolated. The channel masks employed for accumulation (not to be confused with the channel mask array of a node) are set as constants for the accumulation pixel shader.

At a step 390, the processing module initiates the accumulation pixel shader, which renders the deviation totals textures from the relevant ancestor nodes into the deviation totals texture(s) of current accumulation node 380. The accumulation pixel shader uses a quad to simply draw the relevant ancestor node deviation totals textures into the deviation totals texture(s) of the current accumulation node. To properly accumulate the deviation, the accumulation pixel shader will access all of the relevant ancestor nodes' deviation totals textures that have been set as pixel shader texture inputs. The accumulation pixel shader will then modulate the texels of each deviation totals texture with a channel mask to identify the deviation channel relevant to the current accumulation node. The accumulation pixel shader next replicates the non-zero channel into all other color channels. Finally, the accumulation pixel shader adds all the replicated totals together.

In the unlikely event that an ancestor node, from which deviation is to be inherited, has an empty coverage mask, no deviation will have been calculated for that ancestor node. This situation does not create a problem, because the deviation totals texture of the ancestor node was initialized to 0 upon creation and never gets updated. The ancestor node will therefore contribute no additional deviation to the accumulated totals. However, an optimization may be employed to avoid sampling these ancestor nodes in the accumulation pixel shader. These ancestor nodes can be completely ignored in the accumulation.

Find Best Matching Patterns

Figure 15:
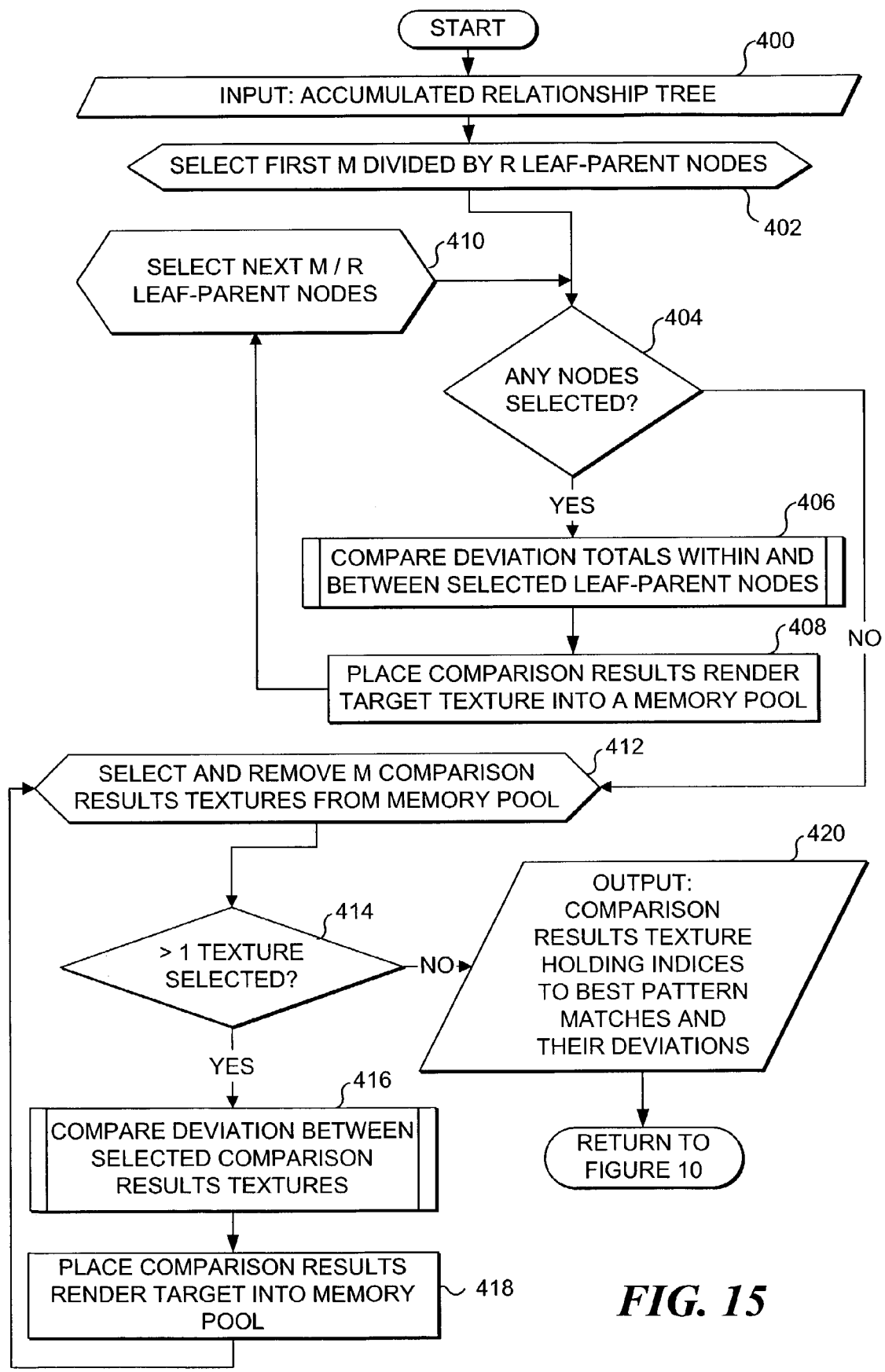
FIG. 15 is a flow diagram illustrating logic for determining the best matching pixmaps to represent the cells of the source image.

Additional detail is now provided for finding the best matching patterns for cells of the source image, as introduced at step 306 of FIG. 10. FIG. 15 is a flow diagram illustrating the logic for determining the best matching pixmaps to represent the cells of the source image. As briefly discussed above, the determinations are made by comparing the deviation totals across all immediate parent nodes of the leaf nodes to find the smallest deviation at every texel location of a deviation totals map, which relates to every cell location of the source image.

Similar to other processes described above, comparing the deviation totals across these leaf-parent nodes is done by accessing the deviation totals textures of leaf-parent nodes in rendering passes and writing out the minimum deviations. Thus, the input to this process is the relationship tree of nodes with accumulated deviation totals, referred to herein as an accumulated relationship tree 400. At a step 402, the processing module attempts to access and select up to m of the leaf-parent nodes from accumulated relationship tree 400. If more than one simultaneous render target is supported by the graphics pipeline, the selected number of leaf-parent nodes must be less than m. More specifically, if r multiple render targets are supported, only m divided by r (m/r) leaf-parent nodes can be compared in a pass, because each leaf-parent node comprises r different deviation totals textures to be compared.

At a decision step 404, the processing module determines whether any leaf-parent nodes were selected. If leaf-parent nodes were accessed, the processing module prepares and initiates a leaf-parent comparison shader, at a step 406, which is a pixel shader that compares deviation totals between the selected leaf-parent nodes. If accumulated relationship tree 400 comprises less than m leaf-parent nodes, only this leaf-parent comparison shader is required to arrive at a final minimum deviation result. However, if accumulated relationship tree 400 comprises more than m leaf-parent nodes, two different types of comparison shaders are required to arrive at a final minimum deviation result. The leaf-parent comparison shader compares the leaf-parent nodes' deviation totals textures to output deviation minimums, along with index values identifying the leaf nodes (and corresponding pixmaps) that yielded those deviation minimums. An intermediate results comparison shader is used to compare intermediate results produced by the leaf-parent comparison shader. Thus, groups of up to m leaf-parent nodes (or groups of fewer than m, if the implementation is using multiple render targets) are first rendered using the leaf-parent comparison shader to find deviation minimums between them. These resulting intermediate deviation minimums are sampled into the intermediate results comparison shader to find the deviation minimums between all groups.

After the leaf-parent comparison shader determines deviation minimums and places the deviation minimums in an intermediate comparison result texture, the processing module stores this comparison results texture in a first memory pool, at a step 408. If less than m divided by r leaf-parent nodes were present in the relationship tree to be compared, this comparison result texture comprises the final deviation minimums. However, if more than m divided by r leaf-parent nodes were present in the list, this comparison render target texture comprises the intermediate deviation minimums. Correspondingly, at a step 410, the processing module attempts to access and select a next group of m divided by r leaf-parent nodes from accumulated relationship tree 400. The processing module then determines again, at decision step 404, whether any leaf-parent nodes were selected. If more leaf-parent nodes were selected, the leaf-parent comparison shader renders another comparison result texture of intermediate deviation minimums.

However, when all leaf-parent nodes have been compared, the processing module attempts to access up to m comparison results textures from the first memory pool, at a step 412. At a decision step 414, the processing module determines whether more than one comparison render target texture was accessed. If so, the processing module prepares and initiates the intermediate results comparison shader, at a step 416, which is a pixel shader used to compare the intermediate deviation minimums of the accessed comparison results textures. At a step 418, the processing module stores the produced comparison results texture of the intermediate results comparison shader into a second memory pool. The processing module then attempts to access up to another m comparison results textures from the first memory pool, at step 412. When all comparison results textures from the first memory pool have been compared by the intermediate results comparison shader, the (smaller) set of comparison results textures produced by the intermediate results comparison shader passes will be placed into another memory pool. As before, these (smaller) set of comparison results textures will also be compared using rendering passes employing intermediate results comparison shaders to produce yet another smaller set of comparison results textures. In this way, a final comparison results texture 420 will eventually be arrived at, and is returned for further processing according to the remaining logic of FIG. 10. Final comparison render target texture 420 comprises indices of the best pixmap matches and their corresponding deviation values.

Leaf-Parent Comparison Shader

Figure 16:
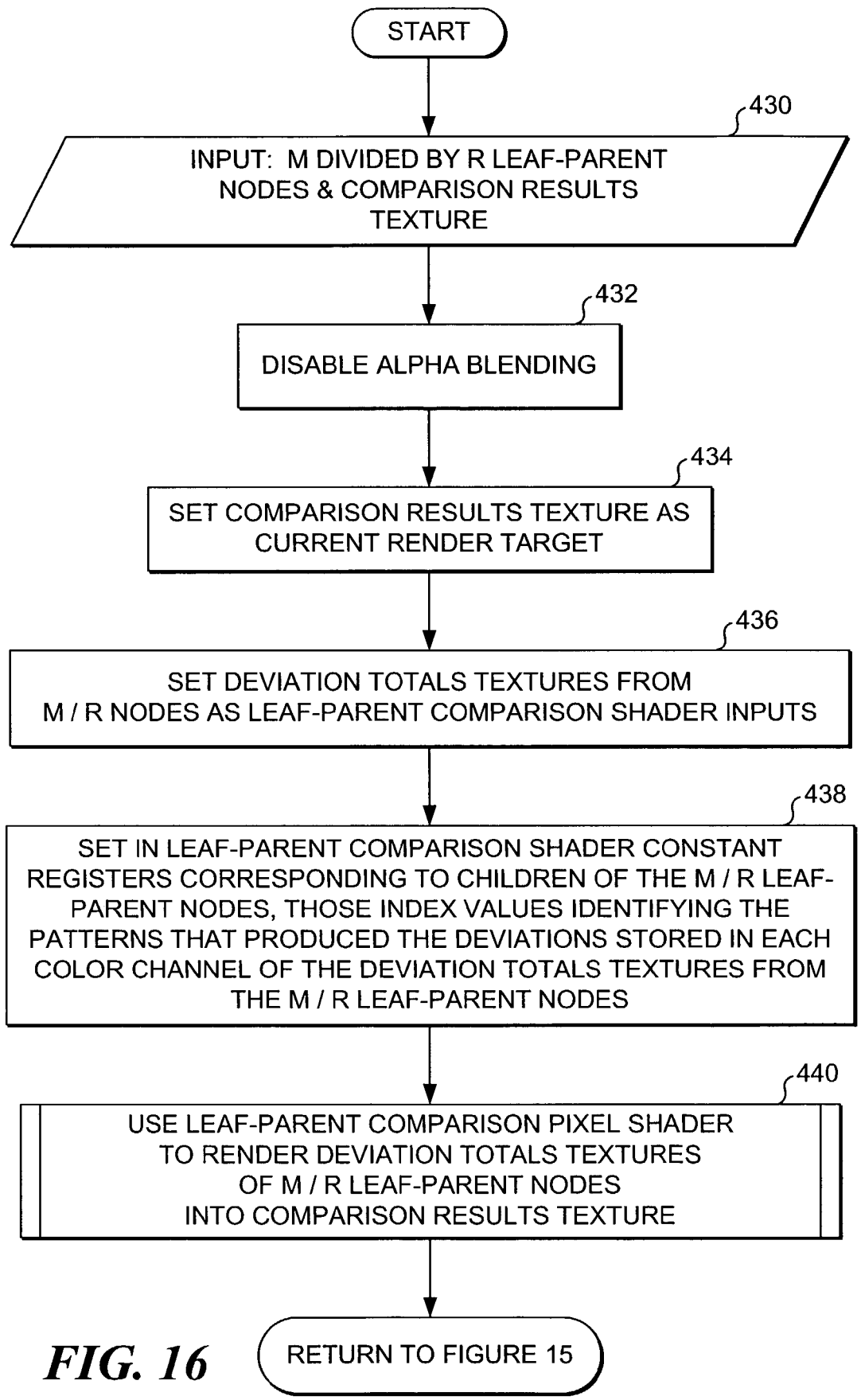
FIG. 16 is a flow diagram illustrating logic for preparing to execute a leaf-parent comparison shader that will compare deviation totals among selected leaf-parent nodes, and write resulting minimum deviations to a comparison results render target texture.

Additional detail is now provided for comparing deviation totals between selected leaf-parent nodes, as introduced at step 406 of FIG. 15. FIG. 16 is a flow diagram illustrating the logic for preparing to execute the leaf-parent comparison shader that will compare deviation totals between selected leaf-parent nodes and produce a comparison results texture of (possibly intermediate) deviation minimums. Input 430 to this preparation process comprises m divided by r selected leaf-parent nodes (including the corresponding leaf-parent node deviation totals textures) and a comparison results texture. As a first preparation step 432, alpha blending is disabled to overwrite comparison results from a previous frame, as explained above.

At a step 434, the processing module sets the comparison results texture as the current render target. At a step 436, the processing module then sets the deviation totals textures of up to m leaf-parent nodes as inputs to the leaf-parent comparison shader for rendering. Although m texture fetches may be supported by the leaf-parent comparison shader, it might not be possible to sample from m leaf-parent nodes. Each deviation totals texture stores n different deviations. Thus, m×n comparisons must be made in the leaf-parent comparison shader. However, if the leaf-parent comparison shader does not support enough instructions to perform m×n comparisons in a single rendering pass, a smaller number of leaf-parent nodes may have to be used in a rendering pass. Also, recall that if r simultaneous render targets are supported, only m divided by r nodes can be compared in a pass, because each leaf-parent node itself contains r different deviation totals textures to be compared. Therefore, the processing module preferably sets the deviation totals textures from m divided by r leaf-parent nodes as inputs to the leaf-parent comparison shader for a rendering pass.

At a step 438, the processing module sets index values in the leaf-parent comparison shader constant registers. The indices correspond to the leaf nodes of the m divided by r leaf-parent nodes, wherein the deviation totals of the m divided by r leaf-parent nodes have been set as textures. The indices identify the pixmaps that produced the deviations stored in each color channel of those deviation totals textures. A comparison results texture of at least two color channels is required for the current render target with the same dimensions as the deviation totals textures of the leaf-parent nodes. The first channel will store the minimum deviation found at each texel of the deviation totals textures. The second channel will store an index to the pixmap producing that minimum deviation. These indices are stored in the leaf-parent comparison shader's constant registers, and the indices correspond to the pixel shader texture input slots (i.e., texture stages) in which the deviation totals textures have been set. For example, the blue channel of constant register 0 for the leaf-parent comparison shader would contain the index to the pixmap contained in the first child (i.e., the first leaf node) of the first leaf-parent node being compared. The deviation totals texture of that leaf node is set in pixel shader texture input slot 0. If, after comparing the deviations of all channels of all accessed deviation totals textures, the minimum value is found to be the deviation value in the blue channel of deviation totals texture 0, that deviation value is written out to the first color channel of the current render target output pixel. Also, the index stored in the blue channel of constant register 0 is written to the second channel of the current render target output pixel. However, the indices do not necessarily need to be encoded per-channel in the leaf-parent comparison shader constant input registers to correspond with the encoding of the deviation totals. Instead, the indices may be separated out into different constant registers, if it is possible with the available constant registers and if doing so reduces the required number of leaf-parent comparison shader instructions. In any case, it is important to ensure indices are clearly mapped to the corresponding deviations stored in the deviation totals textures.

The processing module then initiates the leaf-parent comparison shader, at a step 440, to render the deviation totals textures into the comparison results texture. After rendering, the comparison results texture will contain the local deviation minimums pertaining to the group of leaf-parent nodes compared. If the group of leaf-parent nodes is fewer than all of the leaf-parent nodes, the comparison results texture will comprise intermediate deviation minimums, as discussed above. All other leaf-parent node groups will then be compared in the same way, also yielding intermediate results.

To further clarify, FIG. 17 provides a flow diagram illustrating the logic of the leaf-parent comparison shader used to determine deviation minimums between one group of leaf-parent nodes. Leaf-parent comparison shader input 442 includes m samples from the deviation totals textures of m divided by r leaf-parent nodes. Leaf-parent comparison shader input 442 also includes m×c pixmap indices set as constants. Recall that c is the number of color channels available in each pixel of a render target in a graphics pipeline (i.e., c=n/r).

At a step 444, the leaf-parent comparison shader initializes a variable r0 to a maximum possible value, so that this maximum value can prospectively be replaced with a minimum deviation value. At a step 446, the leaf-parent comparison shader initializes a variable r1 to an arbitrary pixmap index from one of the leaf-parent comparison shader constants. At a step 448, the leaf-parent comparison shader initializes a counter i to zero (0). The leaf-parent comparison shader then determines, at a decision step 450, whether counter i is less than m. If counter i is less than m, the leaf-parent comparison shader initializes a sub-counter j to 0, at a step 452. At a decision step 454, the leaf-parent comparison shader determines whether sub-counter j is less than c.

If sub-counter j is less than c, the leaf-parent comparison shader determines, at a decision step 456, whether the deviation stored in channel j of a sample i is less than the current value stored in variable r0. If that deviation is less than the current value stored in variable r0, the leaf-parent comparison shader replaces the current value stored in variable r0 with that deviation from channel j of sample i, at a step 458. At this step, the leaf-parent comparison shader also copies the pixmap index corresponding to that deviation from the constant register of the pixmap index into variable r1, thereby replacing the previous index stored in variable r1. Once the copies are made, or if the deviation in channel j of sample i is greater than or equal to variable r0, the leaf-parent comparison shader increments the sub-counter j, at a step 460. Control then returns to decision step 454 to determine whether other copy operations should be performed for an even smaller deviation value.

Once the lowest deviation from the channels of sample i has been selected and copied into variable r0, and the corresponding pixmap index has been copied into variable r1, the leaf-parent comparison shader increments counter i, at a step 462. Control then returns to decision step 450 to determine whether a lower deviation and corresponding pixmap index exist in another sample.

When the lowest deviation and corresponding pixmap index have been determined and copied into the variables, the leaf-parent comparison shader copies the pixmap index stored in variable r1 into the second channel of the output register, at a step 464. Similarly, at a step 466, the leaf-parent comparison shader copies the minimum deviation value stored in variable r0 into the first channel of the output register. The leaf-parent comparison shader then returns output registers 468 that contain the minimum deviation and corresponding pixmap index. Control then returns to the processing module to continue the logic of FIG. 16, which simply returns to FIG. 15.

Intermediate Results Comparison Shader

Additional detail is now provided for comparing intermediate deviation minimums between comparison results textures, as introduced at step 416 of FIG. 15. FIG. 18 is a flow diagram illustrating the logic for preparing to execute the intermediate results comparison shader that will compare intermediate deviation minimums between comparison results textures. Of course, input 470 to this second preparation process comprises up to m comparison results textures holding the intermediate deviation minimums. Input 470 also includes another comparison results texture to be used to store the results of the latest comparison. At a step 472, alpha blending is again disabled, to overwrite any minimums from the last frame.

At a step 474, the processing module sets the destination comparison results texture as the current render target. At a step 476, the processing module then sets up to m comparison results textures as inputs to the intermediate results comparison shader. The processing module then initiates the intermediate results comparison shader, at a step 478, to render the intermediate deviation minimums into the comparison results texture, which will either hold another set of intermediate deviation results or, if no other source intermediate results textures remain in the comparison pool, the final deviation results. The intermediate results comparison shader differs from the leaf-parent comparison shader in two respects: (a) only a single deviation is obtained from each point sampled from the comparison results textures; and (b) the pixmap index values come from these point samples instead of constant registers. Within the intermediate results comparison shader, the points sampled from each texture are compared to one another by the intermediate minimum deviations stored in the first color channel. The final minimum of these intermediate minimums is then simply output, since the final minimum already has its corresponding pixmap index stored in the corresponding second color channel.

To further clarify the details of this process, FIG. 19 provides a flow diagram illustrating the logic of the intermediate results comparison shader implemented to determine further minimums between the intermediate minimums input, and ultimately to determine final deviation minimums. Intermediate results comparison shader input 480 includes m point samples of intermediate deviation minimums from comparison results textures created by the leaf-parent comparison shader. At a step 482, the intermediate results comparison shader initializes a variable r0 to a maximum possible value that will prospectively be replaced with a minimum deviation value. At a step 484, the intermediate results comparison shader initializes a variable r1 to an arbitrary pixmap index from one of the m point samples (i.e., one of the m texels). At a step 486, the intermediate results comparison shader initializes a counter i to zero (0). The leaf-parent comparison shader then determines, at a decision step 488, whether counter i is less than m. If counter i is less than m, the intermediate results comparison shader determines, at a decision step 490, whether the deviation of point sampled i is less than variable r0.

If the deviation of point sample i is less than variable r0, the intermediate results comparison shader copies the deviation of point sample i from the first channel of point sample i into variable r0, at a step 492. Correspondingly, at this step, the intermediate results comparison shader also copies the pixmap index of point sample i from the second channel of point sample i into variable r1. Once the copies are made, or if the deviation of point sample i is greater than or equal to variable r0, the intermediate results comparison shader increments the counter i, at a step 494. Control then returns to decision step 488 to determine whether more point samples of intermediate minimums remain to be checked (i.e., whether a smaller intermediate minimum can be selected).

When all m of the point samples of intermediate minimums from the intermediate comparison render target texture have been checked, the lowest minimum and corresponding index will be stored in the r0 and r1 variables, respectively. Control then passes to a step 496, in which the intermediate results comparison shader copies the pixmap index that is stored in variable r1 into the second channel of the output register. Similarly, at a step 498, the intermediate results comparison shader copies the final minimum deviation that is stored in variable r0 into the first channel of the output register. The intermediate results comparison shader then returns output register 500 that contains the resulting minimum deviation and corresponding pixmap index. Control then returns to the processing module to continue the logic of FIG. 18, which simply returns to FIG. 15.

Although the above discussion uses a two-channel render target to store comparison results, those skilled in the art will recognize that if a large number of intermediate comparisons are to be made, it may be useful to encode multiple comparison results into a single texture. For example, assume a four channel render target is used to store a deviation and pixmap index pair in two channels from a deviation totals comparison pass of leaf-parent nodes. A second pass comparing other deviation totals of leaf-parent nodes could be made while reusing the render target. However, during the second pass, the minimum deviation and pixmap index pair would be sent to the third and fourth channels, respectively. In comparing intermediate results, the comparison results texture could then provide two deviations for comparison from each texel, which would effectively double the number of comparison results textures sampled in intermediate comparisons.

Interleaving Accumulation Operations with Comparison Operations

As indicated above, an alternate approach can be used to accumulate and compare deviations, starting from the leaf nodes and working up to the root node. Additional detail is now provided regarding this alternate approach for accumulating and comparing deviation corresponding to steps 304 and 306 of FIG. 10. FIG. 20 is a flow diagram illustrating the logic for accumulating and comparing deviation in an interleaved fashion. This alternate approach differs in both the order of operations and details on how comparisons and accumulations are performed. However, the prime difference in this alternate approach lies in the fact that the processing module performs deviation comparisons before accumulating the deviation. At first glance, this order may seem to yield incorrect comparisons, given that final deviation totals have not yet been determined. However, the correct comparisons are possible if comparisons are performed on the correct subset of nodes, based on the way that deviation is stored.

From input relationship tree 400, the processing module attempts to access and select a first leaf-parent node in the relationship tree, at a step 510. At a decision step 512, the processing module determines whether a leaf-parent node was selected. If a leaf-parent node was selected, the processing module compares deviation totals within the selected leaf-parent node, at a step 514. The processing module will have already calculated a deviation for each individual node in the relationship tree at step 314 of FIG. 11. However, the processing module will not yet have accumulated any deviation between nodes. Thus, deviation comparisons can take place within a leaf-parent node at step 514 of FIG. 20. The comparison is made between the deviations stored in the color channels in the deviation totals textures of the individual leaf-parent node only. This approach limits the number of comparisons to the total pixel shader deviation outputs n, instead of the number of texture fetches m. Comparisons between these totals are possible without prior accumulation of deviation because, within the context of the leaf-parent node, the deviation that the leaf-parent node would have inherited is a constant for all children. The inherited deviation is the same because the pixels aggregate in the leaf-parent node are the same for all children (i.e., all leaf nodes). More specifically, the deviation accumulated in any given node from the node's ancestors is inherited by all chidren equally, as evidenced by the ancestors' deviations being replicated to all color channels before being added to the deviation totals of the node during the alternate accumulation processing module described above. Accordingly, the deviation calculated for a leaf-parent node is sufficient to discriminate between the children (i.e., leaf nodes) of the leaf-parent node and determine the lowest deviation among the children.

Once the processing module has determined the children (i.e., the leaf nodes) that are the closest match by having the lowest deviation compared to sibling leaf nodes, the processing module retains the resulting comparison result texture in the leaf-parent node, at a step 516. The processing module then selects another leaf-parent node from the relationship tree, at a step 518. The deviation comparison is repeated at step 514, for each leaf-parent node.

It should be clarified that when a child (i.e., a leaf node) is selected as having the minimum deviation relative to its siblings, the leaf node is selected only in terms of a single texel in the overall comparison. All of the sibling leaf nodes can and will be selected as having the minimum deviation at different texel locations in the deviation totals comparison. As a result, the indices to the pixmaps producing the minimum deviations must also be stored per-texel after the comparison. This storage may be done as before, with the comparison results texture, by storing deviation in one channel and the pixmap index in another. The comparison shader used in such a comparison is the same as that used for comparing the deviation totals of leaf-parent nodes in the first approach described above (i.e., FIGS. 16 and 17). Note, however, that the graphics pipeline must support at least r more texture fetches than comparison shader deviation outputs n, if the processing module is later to accumulate the deviation from the comparison results textures up to parents in single passes.

When the lowest deviation is determined through comparisons for all the leaf-parent nodes, the processing module accumulates and compares deviation totals up each level of parent nodes, at a step 520, until the root node is completed. More specifically, once all comparisons have been made for the leaf-parent nodes, deviation is accumulated up to the second level parent nodes. This accumulation is performed in a looping fashion at each level as follows. For every parent node, the processing module sets the comparison results textures of the parent node's n children as texture inputs in a pixel shader. The processing module also sets the r deviation totals texture(s) of the parent as texture inputs in the pixel shader (hence, the need for m>=n+r in the graphics pipeline). The processing module renders these textures into another comparison results texture at the level of the parent being processed.

The pixel shader used in this scenario samples the deviation totals texture(s) of the parent and all comparison results textures from the children, adds the deviations from the comparison results samples into their corresponding channels in the deviation totals sample(s), compares the totals, and outputs the minimum deviation along with its corresponding pixmap index from the comparison results texture selected. In this way, deviation is accumulated up from the children before comparing the totals stored in the parent. As at the leaf-parent node level, where the children could be compared to one another, the deviation sum produced in the parent is enough to distinguish between the child sub-trees for the best pixmap match. Once the processing module has selected a sub-tree, the best pixmap within that sub-tree has already been found. The process continues up the tree, performing simultaneous accumulation and comparison renders at each level until the root of the tree is reached. By the time the processing module reaches the root node, the best matching pixmaps have been determined and output in the root's comparison results texture 420. The contents of this comparison results texture is equivalent to that produced by the first accumulation approach described above.

If the graphics pipeline does not support at least n+r texture fetches, a different technique can be employed that accumulates deviation in single passes. However, significantly greater color channel precision will be required compared to that needed to store deviation and pixmap indices. Instead of passing deviation up from n children to a parent by setting the comparison results of the children as individual textures, the processing module may merge the comparison results of the children into a single results texture across all children and sample from that results texture instead. In this case, when the processing module makes a comparison render pass for a child, instead of writing out deviation-index pairs into a two-channel render target, the processing module encodes the deviation and pixmap index into a single scalar value, which is then written to one channel of an n-channel combined comparison results texture. This combined comparison results texture stores the comparison results of all children, with one comparison result per channel. When the processing module performs a comparison pass for the next level parent node, the processing module samples from this combined comparison results texture and the deviation totals texture(s) of the next level parent node, requiring only 1+r fetches. Note, however, that the ensuing comparison is complicated by having to first decode deviations from the encoded color channels before adding the deviations to the next level parent node totals and comparing the deviations. The processing module must also re-encode deviation comparison results with pixmap indices, before writing an updated encoded scalar value. Thus, this approach increases back end processing time in the graphics processing unit. Therefore, the capabilities of the graphics pipeline affect whether a multi-pass implementation or a single-pass implementation is preferable.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for representing source data with a plurality of data patterns, wherein each data pattern includes a unique combination of pattern elements, and wherein data patterns are selected to represent the source data without comparing all of the pattern elements of each of the plurality of data patterns to the source data, said method comprising the steps of:
   (a) predefining each of the plurality of data patterns with the plurality of pattern elements arranged along at least one dimension, wherein identical pattern elements are disposed at corresponding locations in some of the plurality of data patterns;
   (b) comparing the plurality of data patterns to each other to define a relationship tree having nodes at a plurality of levels and leaves at a lowest level, said data patterns being grouped within the relationship tree as a function of the pattern elements that are disposed at corresponding locations within the plurality of data patterns, wherein each data pattern is represented by a different leaf of the relationship tree, nodes at each successive level above the lowest level representing pattern elements that are the same and pattern elements that are different in a subset of nodes on an immediately lower level;
   (c) subdividing the source data into a plurality of source cells, wherein each of the plurality of source cells includes a plurality of source cell elements corresponding in number and arrangement to the pattern elements comprising each of the plurality of data patterns;
   (d) at selected nodes of the relationship tree, determining a set of deviations for the node by calculating a deviation between:
      (i) data derived from the plurality of data patterns, and
      (ii) the plurality of source cells;
   (e) propagating the set of deviations to related nodes according to a hierarchical structure of relationships between nodes of the relationship tree; and
   (f) for each source cell of the plurality of source cells, selecting a matching data pattern from among the plurality of data patterns that provides a smallest set of deviations from the source cell, so that the source data are represented by the data patterns thus selected.

2. The method of claim 1, further comprising the steps of:
   (a) comparing the plurality of data patterns to each other;
   (b) forming subsets of the plurality of data patterns comprising the leaves, by selecting the data patterns having the most pattern elements that are the same at the corresponding locations in the data patterns, to be in each subset.

3. The method of claim 2, wherein the step of comparing the plurality of data patterns to each other comprises the steps of:
   (a) determining the subset of data patterns from the plurality of data patterns that comprise a maximum number of identical pattern elements disposed at corresponding locations within the plurality of data patterns;
   (b) storing the subset of data patterns as a set of child nodes in the relationship tree;
   (c) removing the child nodes from further consideration for another set of child nodes; and (d) repeating steps (a) through (c) until all of the data patterns comprising the plurality of data patterns have been stored in one of the sets of child nodes.

4. The method of claim 3, further comprising the steps of:
(a) after at least one set of child nodes has been stored, constructing a parent node that identifies equivalent pattern elements disposed at corresponding locations in all data patterns for all child nodes of the parent node;
(b) repeating step (a) to create other parent nodes at a current level of the relationship tree; and
(c) repeating steps (a) and (b) for successive levels of the relationship tree, until a single parent node is constructed as a root node of the relationship tree.

5. The method of claim 4, wherein the subsets of data patterns generally comprise a number of data patterns, said number being equal to a product of a number of color channels per pixel supported by a graphics pipeline used to implement the method, and a number of simultaneous render targets supported by the graphics pipeline.

6. The method of claim 4, wherein the step of constructing a parent node comprises the steps of:
(a) creating an aggregate mask that identifies each location at which corresponding pattern elements are equivalent in all of the data patterns referenced by the set of child nodes;
(b) creating a coverage mask that defines pattern elements for which the deviation is calculated and propagated;
(c) creating a composite map of the subset of data patterns, wherein the composite map comprises a multi-dimensional array of pattern elements from all data patterns of the subset, and the multi-dimensional array stores together groups of pattern elements, wherein each group of pattern elements comprises pattern elements disposed at a common location in the subset of data patterns; and
(d) creating a channel mask that associates a color channel of a graphics pipeline with a child node of a parent node and indicates whether the child node will inherit the deviation from the parent node as a function of a color channel intensity.

7. The method of claim 6, further comprising the step of creating a bilinear mask for source data of a black and white image, wherein the bilinear mask identifies pattern elements for which a bilinear optimization may be employed by marking all non-overlapping 2×2 groupings of pattern elements that are of an equal color, have equal channel masks, and lie within the coverage mask.

8. The method of claim 1, wherein the source data comprises an image, and each of the plurality of data patterns comprises a pixel map.

9. The method of claim 1, wherein the step of determining a set of deviations comprises the steps of:
(a) rearranging all of the source cell elements from the plurality of source cells so as to group together source cell elements from identical locations within a source cell, thereby creating swizzled source cell elements;
(b) setting a number of swizzled source cell elements as inputs to a pixel shader of a graphics pipeline, wherein said number corresponds to at least one unique pattern element of the data derived from the plurality of data patterns associated with the node;
(c) selecting as a constant for the pixel shader, the at least one unique pattern element of the node from the data derived from the plurality of data patterns associated with the node;
(d) rendering the number of swizzled source cell elements with the pixel shader of the graphics pipeline and thereby comparing each of the number of swizzled source cell elements to the at least one unique pattern element for determining a deviation between each of the number of swizzled source cell elements and the at least one unique pattern element; and
(e) repeating steps (c) through (d) until all of the at least one unique pattern elements have been compared to the number of swizzled source cell elements, to calculate a set of deviations between all unique pattern elements of the node and the number of swizzled source cell elements.

10. The method of claim 1, wherein the step of propagating the set of deviations comprises one of the steps of:
(a) propagating the set of deviations from a root node of the relationship tree down to a plurality of leaf-parent nodes at a level immediately above the leaves at the lowest level; and
(b) propagating the set of deviations from a leaf-parent node of the relationship tree up to the root node.

11. The method of claim 1, wherein the step of propagating the set of deviations comprises the step of accumulating the set of deviations for the node with another set of deviations for a related node of the relationship tree.

12. A memory medium having machine instructions comprising a boot code stored thereon for carrying out the steps of claim 1.

13. A system for representing source data with a plurality of data patterns, wherein each data pattern includes a unique combination of pattern elements, and wherein data patterns are selected to represent the source data without comparing all of the pattern elements of each of the plurality of data patterns to the source data, comprising:
(a) a processor; and
(b) a memory in communication with the processor, said memory storing the source data and the data patterns, and storing machine instructions that cause the processor to perform a plurality of functions, including:
(i) predefining each of the plurality of data patterns with the plurality of pattern elements arranged along at least one dimension, wherein identical pattern elements are disposed at corresponding locations in some of the plurality of data patterns;
(ii) comparing the plurality of data patterns to each other to define a relationship tree having nodes at a plurality of levels and leaves at a lowest level, said data patterns being grouped within the relationship tree as a function the pattern elements that are disposed at corresponding locations within the plurality of data patterns, wherein each data pattern is represented by a different leaf of the relationship tree, nodes at each successive level above the lowest level representing pattern elements that are the same and pattern elements that are different in a subset of nodes on an immediately lower level;
(iii) subdividing the source data into a plurality of source cells, wherein each of the plurality of source cells includes a plurality of source cell elements corresponding in number and arrangement to the pattern elements comprising each of the plurality of data patterns;
(iv) at selected nodes of the relationship tree, determining a set of deviations for the node by calculating a deviation between data derived from the plurality of data patterns and the plurality of source cells;
(v) propagating the set of deviations to related nodes according to a hierarchical structure of relationships of the nodes in the relationship tree; and (vi) for each source cell of the plurality of source cells, selecting a matching data pattern from among the plurality of data patterns that provides a smallest set of deviations from the source cell, so that the source data are represented by the data patterns selected thereby.

14. The system of claim 13, wherein the machine instructions further cause the processor to perform the functions of:
(a) comparing the plurality of data patterns to each other; and
(b) forming subsets of the plurality of data patterns comprising the leaves, by selecting the data patterns having the most pattern elements that are the same at the corresponding locations in the data patterns to be in each subset.

15. The system of claim 14, wherein the machine instructions further cause the processor to compare the plurality of data patterns to each other by causing the processor to perform the functions:
(a) determining the subset of data patterns from the plurality of data patterns that comprise a maximum number of identical pattern elements disposed at corresponding locations within the plurality of data patterns;
(b) storing the subset of data patterns as a set of child nodes in the relationship tree;
(c) removing the child nodes from further consideration for another set of child nodes; and
(d) repeating steps (a) through (c) until all of the data patterns comprising the plurality of data patterns have been stored in one of the sets of child nodes.

16. The system of claim 15, further comprising a graphics pipeline, wherein the machine instructions further cause the processor to construct a parent node by causing the processor to perform the functions of:
(a) creating an aggregate mask that identifies each dimensional location at which a corresponding pattern element is equivalent in all of the data patterns referenced by the set of child nodes;
(b) creating a coverage mask that defines pattern elements for which the deviation must be calculated and propagated;
(c) creating a composite map of the subset of data patterns, wherein the composite map comprises a multi-dimensional array of pattern elements from all data patterns of the subset, and the multi-dimensional array stores together groups of pattern elements, wherein each group of pattern elements comprises pattern elements disposed at a common location in the subset of data patterns; and
(d) creating a channel mask that associates a color channel of the graphics pipeline with a child node of a parent node, indicating whether the child node will inherit the deviation from the parent node as a function of a color channel intensity.

17. The system of claim 15, wherein the machine instructions further cause the processor to perform the functions of:
(a) after at least one set of child nodes has been stored, constructing a parent node that identifies equivalent pattern elements disposed at corresponding locations in all data patterns for all child nodes of the parent node;
(b) repeating step (a) to create other parent nodes at a current level of the relationship tree; and
(c) repeating steps (a) and (b) at successive levels until a single parent node is constructed as a root node of the relationship tree.

18. The system of claim 13, wherein the machine instructions further cause the processor to determine a set of deviations by causing the processor to perform the functions of:
(a) rearranging all source cell elements from the plurality of source cells so as to group together source cell elements from identical locations within a source cell, thereby creating swizzled source cell elements;
(b) setting a number of swizzled source cell elements as inputs to a pixel shader of a graphics pipeline, wherein said number corresponds to at least one unique pattern element of the data derived from the plurality of data patterns associated with the node;
(c) selecting as a constant for the pixel shader, the at least one unique pattern element of the node from the data derived from the plurality of data patterns associated with the node;
(d) rendering the number of swizzled source cell elements with the pixel shader of the graphics pipeline, thereby comparing each of the number of swizzled source cell elements to the at least one unique pattern element and thereby determining a deviation between each of the number of swizzled source cell elements and the at least one unique pattern element; and
(e) repeating steps (c) through (d) until all of the at least one unique pattern elements have been compared to the number of swizzled source cell elements, thereby calculating a set of deviations between all unique pattern elements of the node and the number of swizzled source cell elements.

19. The system of claim 13, wherein the machine instructions further cause the processor to propagate the set of deviations by causing the processor to perform the functions of:
(a) propagating the set of deviations from a root node of the relationship tree down to a plurality of leaf-parent nodes at a level immediately above the leaves at the lowest level; and
(b) propagating the set of deviations from a leaf-parent node of the relationship tree up to the root node.

20. A method for representing source data with a plurality of data patterns, each of which includes a unique combination of pattern elements, without comparing all of the pattern elements of each of the plurality of data patterns to the source data, comprising the steps of:
(a) creating a relationship tree having nodes at a plurality of levels, including leaves at a lowest level, said relationship tree being created as a function of equivalent pattern elements being disposed at corresponding locations within the plurality of data patterns, wherein each data pattern is represented by a different leaf of the relationship tree, nodes at each successive level above the lowest level representing pattern elements that are the same and pattern elements that are different in leaves that are successors to the nodes at each successive level above the lowest level;
(b) at selected nodes of the relationship tree, determining a set of deviations for the node by comparison to the source data;
(c) propagating the set of deviations to related nodes according to a hierarchical structure of relationships in the relationship tree; and
(d) for each of a plurality of cells that subdivide the source image, selecting a matching data pattern from among the plurality of data patterns, said matching data pattern providing a smallest set of deviations from the source cell, so that the source data are represented by the data patterns thus selected.

* * * * *